US011856137B2

(12) United States Patent
Way et al.

(10) Patent No.: US 11,856,137 B2
(45) Date of Patent: *Dec. 26, 2023

(54) PERFORMING A CUSTOM ACTION DURING CALL SCREENING BASED ON A PURPOSE OF A VOICE CALL

(71) Applicant: Capital One Services, LLC, McLean, VA (US)

(72) Inventors: Brendan Way, Brooklyn, NY (US); Kaylyn Gibilterra, New York, NY (US); Abdelkader M'Hamed Benkreira, New York, NY (US)

(73) Assignee: Capital One Services, LLC, McLean, VA (US)

( * ) Notice: Subject to any disclaimer, the term of this patent is extended or adjusted under 35 U.S.C. 154(b) by 54 days.

This patent is subject to a terminal disclaimer.

(21) Appl. No.: 17/301,007

(22) Filed: Mar. 22, 2021

(65) Prior Publication Data
US 2021/0289071 A1 Sep. 16, 2021

Related U.S. Application Data

(63) Continuation of application No. 16/815,754, filed on Mar. 11, 2020, now Pat. No. 10,958,784.

(51) Int. Cl.
*H04M 3/436* (2006.01)
*G06Q 40/02* (2023.01)
(Continued)

(52) U.S. Cl.
CPC ............ *H04M 3/4365* (2013.01); *G06N 5/04* (2013.01); *G06N 20/00* (2019.01); *G06Q 20/3223* (2013.01); *G06Q 20/4016* (2013.01);
*G06Q 20/42* (2013.01); *G06Q 40/02* (2013.01); *G10L 15/00* (2013.01); *G10L 15/22* (2013.01); *G10L 2015/088* (2013.01); *G10L 2015/223* (2013.01)

(58) Field of Classification Search
CPC ....... H04M 3/4365; G06N 20/00; G06N 5/04; G06Q 20/3223; G06Q 20/4016; G06Q 20/42; G06Q 40/02; G10L 15/08; G10L 15/22; G10L 2015/088; G10L 2015/223
USPC ....................................... 455/414.1
See application file for complete search history.

(56) References Cited

U.S. PATENT DOCUMENTS 8,693,644 B1 * 4/2014 Hodges, Jr. ......... H04M 3/5175
379/265.06
9,667,810 B1 * 5/2017 Brown .............. H04M 15/8355
(Continued)

*Primary Examiner* — Mong-Thuy T Tran
(74) *Attorney, Agent, or Firm* — Harrity & Harrity, LLP

(57) ABSTRACT

A user device may output an indication of an incoming call from a calling device. The user device may receive a request to screen the incoming call. The user device may analyze a transcription of voice input, received from the calling device, for one or more keywords related to a request for funds. The user device may output one or more input options, which permit a user of the user device to respond to the request for funds, including an input option to transfer funds from a first account associated with the user device to a second account associated with the calling device. The user device may detect a user interaction with the input option to transfer funds from the first account to the second account. The user device may transmit a request that causes funds to be transferred from the first account to the second account.

20 Claims, 13 Drawing Sheets

(51) Int. Cl.
  *G06Q 20/32* (2012.01)
  *G06Q 20/42* (2012.01)
  *G06Q 20/40* (2012.01)
  *G06N 5/04* (2023.01)
  *G10L 15/22* (2006.01)
  *G10L 15/00* (2013.01)
  *G06N 20/00* (2019.01)
  *G10L 15/08* (2006.01)

(56) References Cited

U.S. PATENT DOCUMENTS

| | | | |
|---|---|---|---|
| 10,110,738 B1 * | 10/2018 | Sawant | G06N 3/0445 |
| 10,142,461 B2 * | 11/2018 | Gainsboro | H04M 3/4936 |
| 10,200,531 B2 * | 2/2019 | Li | H04W 12/12 |
| 10,616,411 B1 * | 4/2020 | Chang | H04M 3/2281 |
| 10,657,971 B1 * | 5/2020 | Newstadt | G06N 20/00 |
| 10,958,784 B1 | 3/2021 | Way | |
| 11,128,753 B2 * | 9/2021 | Meredith | H04M 3/436 |
| 2009/0070263 A1 | 3/2009 | Davis et al. | |
| 2011/0196797 A1 | 8/2011 | Liwerant | |
| 2013/0124416 A1 | 5/2013 | Pawar et al. | |
| 2013/0159170 A1 | 6/2013 | Gandhi et al. | |
| 2013/0346309 A1 | 12/2013 | Giori | |
| 2014/0279457 A1 | 9/2014 | Green et al. | |
| 2016/0125001 A1 * | 5/2016 | Koseki | G06F 16/26 707/741 |
| 2017/0142252 A1 * | 5/2017 | Bhupati | H04M 3/2281 |
| 2018/0005242 A1 * | 1/2018 | Miyamoto | G06Q 20/10 |
| 2018/0020093 A1 * | 1/2018 | Bentitou | G10L 13/00 |
| 2018/0096333 A1 * | 4/2018 | Studnicka | G06Q 20/40145 |
| 2018/0096334 A1 | 4/2018 | Studnicka et al. | |
| 2018/0114127 A1 | 4/2018 | Cole et al. | |
| 2018/0150823 A1 * | 5/2018 | Omojola | B41J 3/00 |
| 2018/0357620 A1 | 12/2018 | Gjondrekaj et al. | |
| 2019/0220839 A1 | 7/2019 | Oliynyk | |
| 2019/0354979 A1 | 11/2019 | Crawford | |
| 2020/0258072 A1 | 8/2020 | Unnerstall et al. | |
| 2020/0265392 A1 | 8/2020 | Garrett | |
| 2020/0327551 A1 * | 10/2020 | Ji | G06Q 20/403 |
| 2021/0128062 A1 * | 5/2021 | Karimli | A61B 5/4884 |
| 2021/0158360 A1 * | 5/2021 | Somani | H04L 63/1416 |
| 2021/0320997 A1 * | 10/2021 | Takemura | G10L 15/1822 |

* cited by examiner

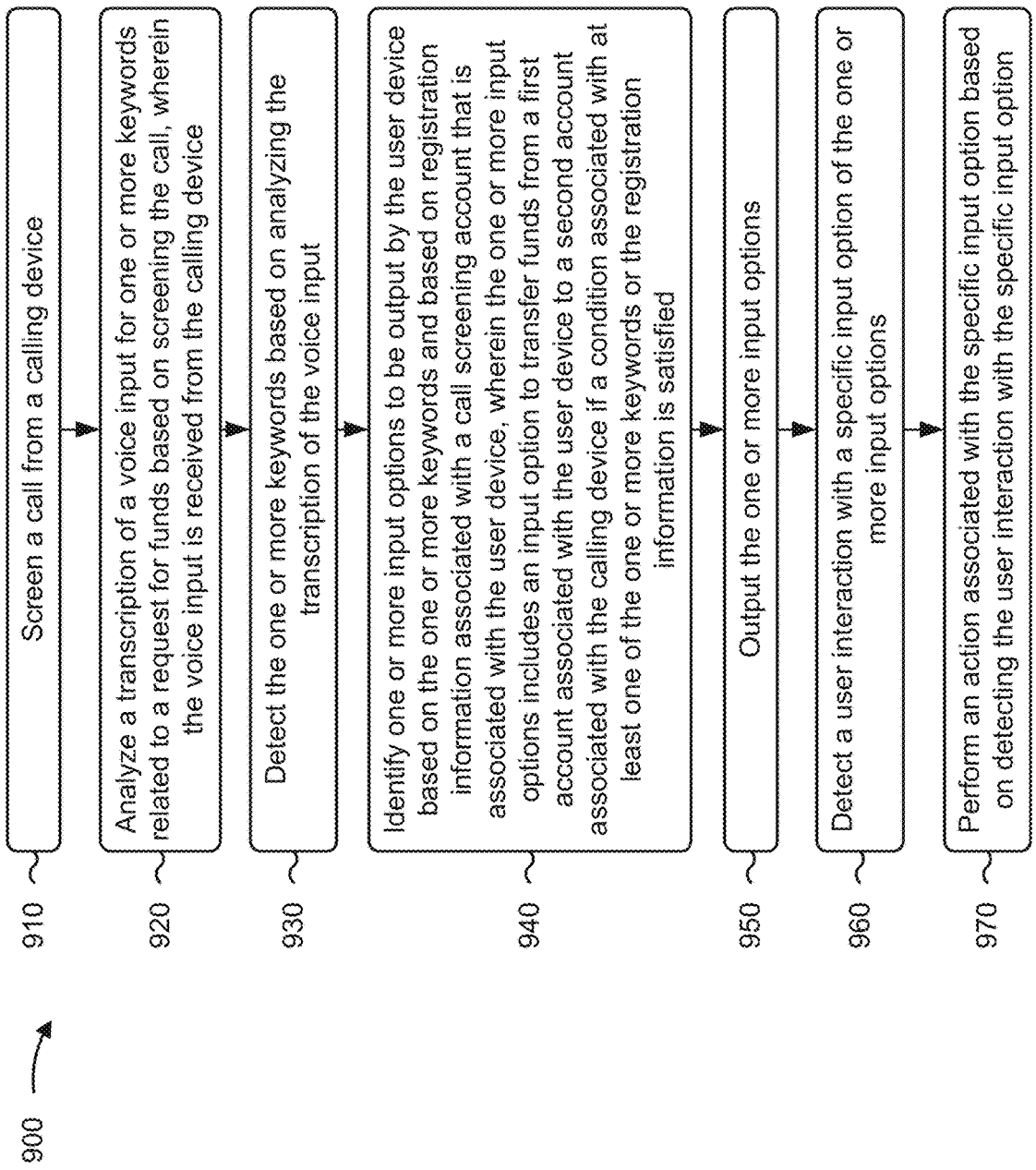

PERFORMING A CUSTOM ACTION DURING CALL SCREENING BASED ON A PURPOSE OF A VOICE CALL

RELATED APPLICATION

This application is a continuation of U.S. patent application Ser. No. 16/815,754, filed Mar. 11, 2020 (now U.S. Pat. No. 10,958,784), which is incorporated herein by reference in its entirety.

BACKGROUND

Call screening is the process of evaluating characteristics of a telephone call before deciding how or whether to answer the call. Call screening may involve determining who or where a call is coming from based on caller identification. Call screening may also involve listening to, recording, and transcribing a message from a caller. A user may decide to accept or deny the call based on the information provided by the call screen.

SUMMARY

According to some implementations, a method may include outputting, by a user device, an indication of an incoming call from a calling device; receiving, by the user device, a request to screen the incoming call; analyzing, by the user device and based on receiving the request to screen the incoming call, a transcription of voice input for one or more keywords related to a request for funds, wherein the voice input is received from the calling device; detecting, by the user device, the one or more keywords based on analyzing the transcription of the voice input; outputting, by the user device, one or more input options that permit a user of the user device to respond to the request for funds, wherein the one or more input options includes an input option to transfer funds from a first account associated with the user device to a second account associated with the calling device; detecting, by the user device, a user interaction with the input option to transfer funds from the first account associated with the user device to the second account associated with the calling device; and transmitting, by the user device and based on detecting the user interaction, a request that causes funds to be transferred from the first account to the second account.

According to some implementations, a user device based on detecting the one or more keywords may include one or more memories; and one or more processors, communicatively coupled to the one or more memories, configured to: receive a request to screen an incoming call from a calling device; analyze a transcription of voice input for one or more keywords related to a request for funds based on receiving the request to screen the incoming call, wherein the voice input is received from the calling device; detect the one or more keywords based on analyzing the transcription of the voice input; identify one or more input options to be output by the user device based on detecting the one or more keywords and based on a fraud likelihood associated with the request for funds, wherein the one or more input options includes an input option to transfer funds from a first account associated with the user device to a second account associated with the calling device if the fraud likelihood satisfies a condition; output the one or more input options; detect a user interaction with a specific input option of the one or more input options; and perform an action associated with the specific input option based on detecting the user interaction with the specific input option.

According to some implementations, a non-transitory computer-readable medium may store one or more instructions. The one or more instructions, when executed by one or more processors of a user device, may cause the one or more processors to: screen a call from a calling device; analyze a transcription of voice input for one or more keywords related to a request for funds based on screening the call, wherein the voice input is received from the calling device; detect the one or more keywords based on analyzing the transcription of the voice input; identify one or more input options to be output by the user device based on the one or more keywords and based on registration information associated with a call screening account that is associated with the user device, wherein the one or more input options includes an input option to transfer funds from a first account associated with the user device to a second account associated with the calling device if a condition associated with at least one of the one or more keywords or the registration information is satisfied; output the one or more input options; detect a user interaction with a specific input option of the one or more input options; and perform an action associated with the specific input option based on detecting the user interaction with the specific input option.

BRIEF DESCRIPTION OF THE DRAWINGS

FIGS. 7-9 are flowcharts of example processes for performing a custom action during call screening based on a purpose of a voice call.

DETAILED DESCRIPTION

Figure 1A:
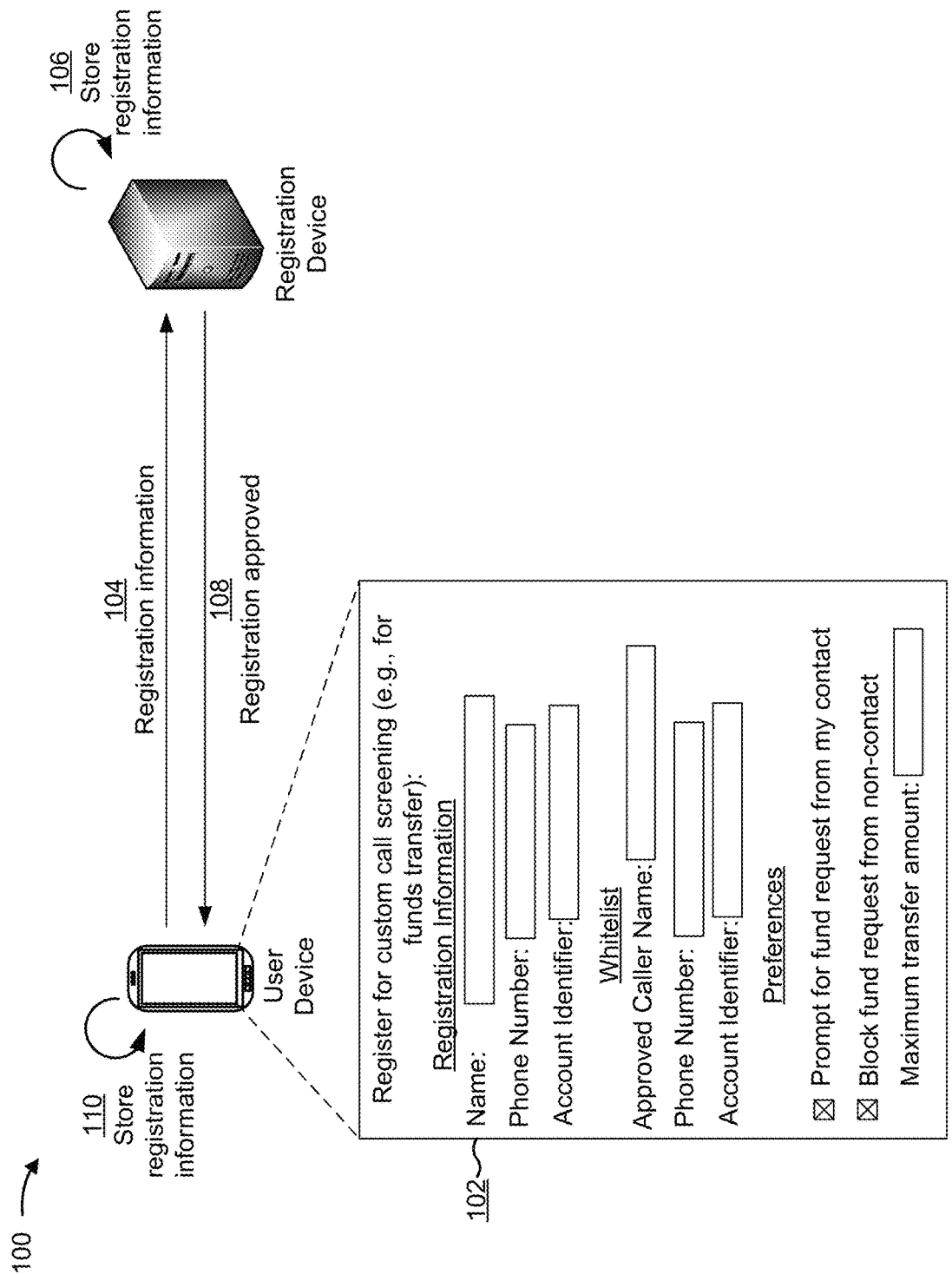
FIGS. 1A-ID are diagrams of one or more example implementations described herein.

The following detailed description of example implementations refers to the accompanying drawings. The same reference numbers in different drawings may identify the same or similar elements.

Call screening involves evaluating a call before deciding how or whether to answer the call. A user of a user device may use a call screening service to screen calls when the user is busy or unable to answer the calls. The user may also use the call screening service to screen calls from callers the user is unfamiliar with (such as a caller with a phone number that is not saved as a contact by the user, a caller with a phone number that is not approved by the user, a robocall, and/or the like).

Call screening may involve enabling a user device to provide an indication of an incoming call to the user. The indication of the incoming call may include caller identification information (such as the caller's name, the phone number of the caller, and/or the like). The user device may provide the user with options for proceeding with the incoming call. The options may include accepting the incoming call, denying the incoming call, or requesting additional information from the caller of the incoming call.

In response to a user selecting the option of requesting additional information from the caller, the user device may transmit a message to the caller of the incoming call. The message may request that the caller state the reason for the call. The caller may then provide a voice input in response to the message. The voice input may include information such as the caller's identity, the purpose of the call, a message to the user, and/or the like. The user device may receive the voice input, record the voice input, transcribe the voice input, and display the voice input as text to the user.

The voice input may be a simple request from the caller for the user to perform an action. After reading the text of the voice input, the user may decide to perform the action requested by the caller. If the action is outside answering or declining the call, the user may have to take additional steps to perform the action. For example, to perform the action requested by the caller, the user may need to unlock or open the user device, locate an appropriate service provider that is capable of performing the action, download and/or execute an application on the user device, and/or request or initiate performance of the action. In some situations, to perform the action requested by the caller, the user may need to access a separate device (such as a computer, a laptop, a tablet, and/or the like) to locate an appropriate service provider that is capable of performing the action, download and/or execute an application on the separate device, and/or request or initiate performance of the action. This may waste computing resources (e.g., processing resources, memory resources, communication resources, and/or the like) associated with the user device or the separate device by requiring a number of additional steps to be performed on the user device and/or the separate device to perform the action requested by the caller.

Additionally, fraudulent phone calls are becoming increasingly widespread. These fraudulent calls (such as robocalls, pre-recorded calls, and/or the like) may provide a pre-recorded message when prompted by a call screening service of the user device. For example, the pre-recorded message may request that the user perform an action. Similar to the situation described above, the pre-recorded message may be transcribed and provided to the user as text. The user may read the text and not identify that the request in the pre-recorded message is fraudulent. The user may then perform the action, as described above.

This kind of fraudulent activity may negatively impact both the user and the service provider. The user may be liable for actions and/or services that arose through the fraudulent request and may attempt to identify and remedy the fraudulent actions and/or services. For example, the user may object to the fraudulent activity, such as contesting the action that was performed. As a result, the user device wastes computing resources associated with performing the action, identifying the fraudulent activity, investigating the fraudulent activity, and/or reporting the fraudulent activity. The service provider may also be negatively impacted and waste computing resources associated with attempting to reverse the fraudulent activity for the user, along with attempting to identify, detect, and diagnose the fraudulent activity.

Some implementations described herein enable a user device to perform a custom action during call screening based on the purpose of a voice call received by the user device. The user device may include a call screening service that requests that a caller of an incoming call from a calling device to the user device provide a voice input relating to the purpose of the call. The user device may receive the voice input from the call screening service and transcribe the voice input into text. The user device may analyze the transcription of the voice input for keywords to determine if a request for the user to perform a custom action is present within the text of the voice input (e.g., an action that is outside of the context of simply answering or rejecting the incoming call). If a request to perform a custom action is detected, the user device may provide an option for performing the custom action to be displayed by the call screening service on a display of the user device. The call screening service may enable the user device to perform and/or cause a service provider to perform the custom action when the option is selected by the user. As a result, the user device conserves computing resources that would have otherwise been used to unlock or open the user device, locate an appropriate service provider that is capable of performing the action, download and/or execute an application on the user device, and/or request or initiate performance of the action and/or a separate device (separate from the user device) conserves computing resources that would otherwise have been used to locate an appropriate service provider that is capable of performing the action, download and/or execute an application on the separate device, and/or request or initiate performance of the action.

Additionally, in some implementations described herein, a fraud detection system may operate in conjunction with the user device to detect a fraudulent request from a caller for the user to perform an action by analyzing the text of the voice input and device information of the calling device (e.g., the device used by the caller to make the call). The fraud detection system may determine a fraud score for the request based on the text of the voice input and the device information of the calling device. The fraud detection system may transmit an indication of a recommended action to be performed by the user device based on the fraud score. As such, a fraudulent request may be identified prior to the user device providing an option, for performing the custom action, to be displayed by the call screening service on the display of the user device. As a result, the user device conserves computing resources that would have otherwise been used to perform the action, identify the fraudulent activity, investigate the fraudulent activity, and/or report the fraudulent activity. The service provider may also conserve computing resources that would have otherwise been used to reverse the fraudulent activity for the user, and/or identify, detect, and diagnose the fraudulent activity.

FIGS. 1A-1D are diagrams of one or more example implementations 100 described herein. As shown in FIGS. 1A-1D, a user device may be associated with a registration device, a calling device, a fraud detection system, and an account backend device. A user of the user device may interact with the user device to register for a custom call screening service with the registration device. The custom call screening service may enable the user device to perform a custom action based on a purpose of a voice call received by the user device from the calling device. In the description below, an example of the custom action is described as transferring funds from an account associated with the user of the user device to an account associated with a caller of the calling device. In some implementations, the custom action may be something other than transferring funds, such as scheduling a service (such as a car service, a cleaning service, a food delivery service, and/or the like), ordering a product, scheduling a meeting, and/or the like. In some implementations, the user of the user device may be permitted to configure the type of custom action to be performed. For example, the user may be permitted to select the custom action from a plurality of potential custom actions, define a unique custom action, and/or the like.

As shown in FIG. 1A, and by reference number 102, the user may use the user device to register for the custom call screening service. For example, the user may use the user device to interact with (e.g., view, fill, complete, and/or the like) a registration form. The registration form may be used to obtain or register a call screening service application associated with the custom call screening service and the registration device. The registration form may be provided to the user device from the registration device. The registration form may be accessed by the user device via a webpage, an application (e.g., the call screening service application), and/or the like. The user may be prompted to input information into the registration form when initially opening or downloading the call screening service application. Additionally, or alternatively, the user may be prompted to input information into the registration form in real time using the call screening service application.

In some implementations, the registration form may have fields for the user to input information into. The fields may relate to registration information, whitelist information (e.g., acceptable and/or approved callers), blacklist information (e.g., non-approved callers), user preferences, and/or the like. The fields identified above are intended as examples of information that may be requested by the registration form. In some implementations, the fields may relate to different information that may be useful for providing the custom call screening service.

For example, the registration information may include fields for a user name, a user phone number, a user account identifier, credentials/login information (e.g., a user name and password), an email address, and/or the like. Additionally, or alternatively, the registration information may include biometric information. The biometric information may be input by a user (e.g., by a fingerprint scan, facial scan, and/or the like).

The account identifier may identify an account associated with the user. As described herein, the account is an account to be used for the transfer of funds. The account may be an account at a financial institution (e.g., a bank account). Additionally, or alternatively, the account may an account associated with the user and associated with a third-party mobile payment system. Additionally, or alternatively, the account may be any account associated with the user. For example, the account may be a food delivery service account, an online ordering service account, a car service account, an online retailer account, and/or the like.

The whitelist information may be information related to callers approved by the user. The whitelist information may include information associated with an approved caller, such as the caller's name, a phone number, an account identifier, credentials/login information (such as a user name), an email address, and/or the like. The user may manually input the whitelist information. Additionally, or alternatively, the user device may automatically input whitelist information into the registration form from approved sources (such as a contact list saved on the user device, a friends list, and/or the like). Additionally, or alternatively, the user device may prompt a user to add information related to a caller to the whitelist information after the user interacts with the caller using the call screening service application.

The blacklist information may be information related to non-approved callers, such as callers not on the whitelist and/or callers previously identified for the blacklist. The blacklist information may include information associated with a non-approved caller, such as the caller's name, a phone number, and/or the like. Callers listed on the blacklist may be prevented from making any requests and/or may be automatically blocked by the call screening service application. Additionally, or alternatively, the user device may prompt a user to add information related to a non-approved caller to the blacklist information after the user interacts with the non-approved caller using the call screening service application.

The user preferences may include options to prompt the user for fund requests from the user contacts and/or whitelist, to block fund requests from non-contacts, to block fund requests from callers listed on the blacklist, to block fund requests from any caller not listed in the whitelist, to set a maximum transfer amount, to set a maximum transfer amount per time period, to set a maximum transfer amount per calling device, to set an auto-accept amount (e.g., a threshold amount such that requests for funds that satisfy the threshold amount will be automatically accepted), to set an authentication level for certain callers (e.g., a threshold amount to auto accept for a particular caller which would not apply to other callers), and/or the like. Additionally, or alternatively, the user preferences may include user permissions, such as allowing a request for funds from anyone, allowing a request from a caller only if the phone number associated with the calling device of the caller is listed in the user's contact list, allowing a request from a caller only if the phone number associated with the calling device of the caller is listed in the whitelist information, and/or the like.

The registration form may be navigable through different techniques, such as moving a cursor, scrolling, tabbing, using keyboard shortcuts, swiping, tapping, using finger gestures, using voice commands, and/or the like. The user may use different input devices for the different techniques. For example, the user may scroll using a mouse wheel, using a trackpad, using a finger of the user, using a touch screen, using a combination of scrolling techniques, and/or the like; the user may move from field-to-field using the "tab" key, using keyboard shortcuts, moving a mouse cursor, using a combination of field navigating techniques, and/or the like; the user may move a cursor using a track pad, using a touch screen, using a mouse, using a combination of cursor moving techniques, and/or the like; the user may input text using a physical keyboard, using a touchscreen keyboard, using copy and paste, using a voice command, using a combination of text input techniques; and/or the like. While some common behaviors associated with interacting with a registration form are listed above, some implementations described herein are not limited to these behaviors.

As shown in FIG. 1A, and by reference number 104, the user device may transmit the information from the registration form to the registration device. Additionally, or alternatively, the user device may transmit various device information associated with the user device or the user. For example, the device information may include an internet protocol (IP) address, location information, and/or the like. In some implementations, the device information may include network information, such as whether the user device communicates with the registration device via a virtual private network (VPN), a type of VPN used by the user device to communicate with the registration device, a network route that carries traffic between the user device and the registration device, one or more network devices included in the network route, whether the network route includes an anonymity network exit node, an internet service provider (ISP) associated with the user device, one or more cookies installed on the user device, one or more software applications installed on the user device, and/or the like. In some implementations, the device information may include information about the user device, such as a type of user device is being used, an operating system (e.g., a type and/or version of operating system) running on the user device, a device identifier associated with the user device, and/or the like. Additionally, or alternatively, the device information may include information identifying a web browser (e.g., a type and/or version of web browser) used by the user device to access the registration form. The examples for device information are listed merely as illustrative examples, and are not intended to limit the scope of what may be considered to be device information.

As shown in FIG. 1A, and by reference number 106, the registration device may store the information from the registration form and the device information. The registration device may associate the information from the registration form with the device information. As shown by reference number 108, the registration device may transmit a registration approval to the user device. The registration may be approved if the registration device determines that there are no matches with other registration form information and/or device information previously stored on the registration device. For example, when the registration device receives the information from the registration form and/or the device information, the registration device may check or compare the information from the registration form and/or the device information against previously stored registration form information and/or device information. If one or more aspects of the received registration form information and/or the device information matches against previously stored registration form information and/or device information, the registration device may transmit to the user device that registration for the custom call screening application is denied. Additionally, or alternatively, if the registration device determines that there is a match between one or more aspects of the received registration form information and/or the device information and previously stored registration form information and/or device information, the registration device may not store the received registration form information and/or the device information. For example, if the information from the registration form of the user includes an account identifier which was previously stored by the registration device, the registration device may deny registration and/or not store the received registration form information and/or the device information. This may serve as an additional level of security by preventing fraudulent users from registering with an account that does not belong to the fraudulent users.

If the registration device determines there is a match, the registration device may transmit a denial of registration to the user device with a message indicating that the inputted registration form information has been previously stored by the registration device. As shown in FIG. 1A, and by reference number 110, if the registration device determines that there is no match, the registration device may transmit to the user device that the registration with the call screening service application is approved and the user device may store registration information.

Figure 1B:
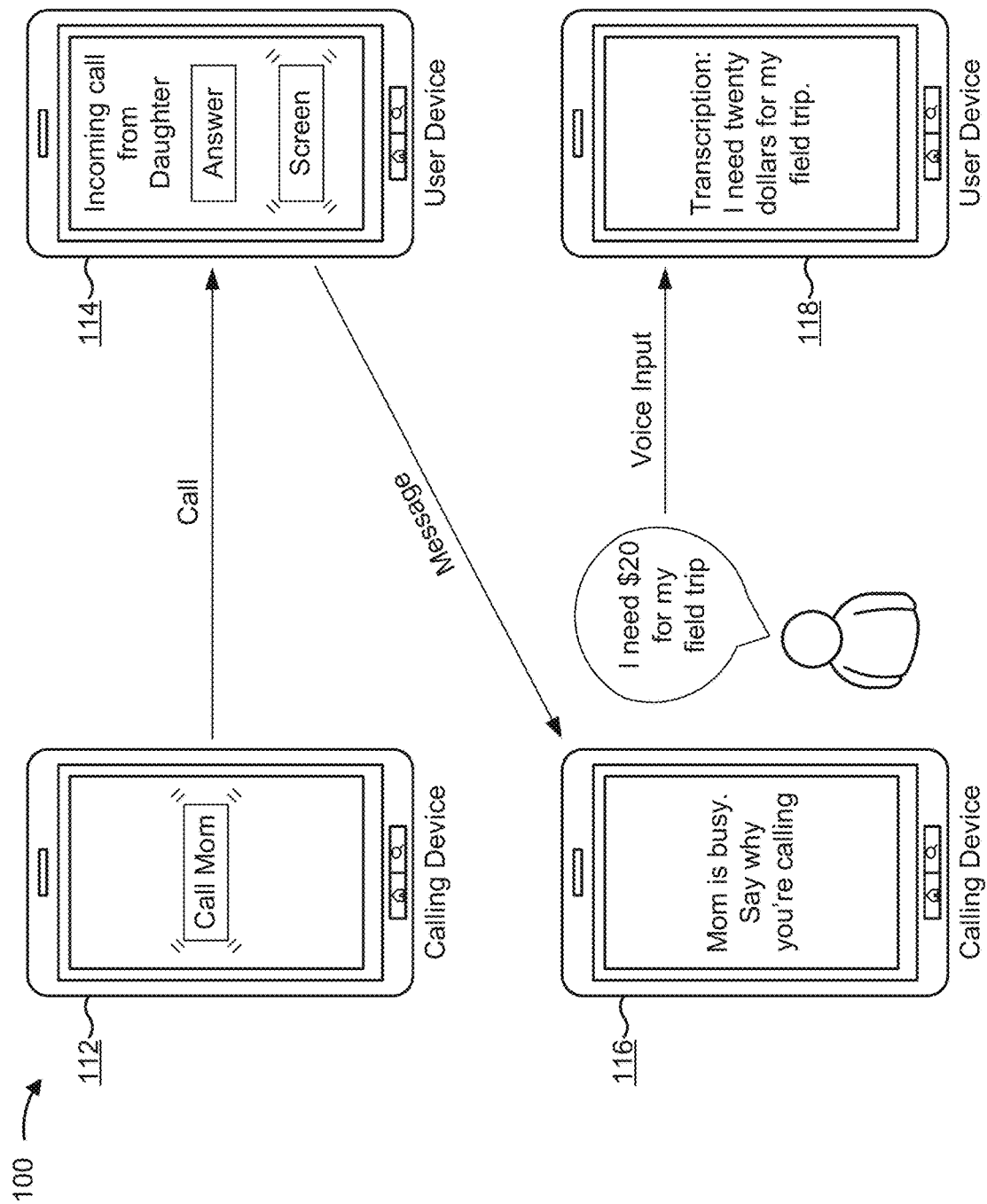

As shown in FIG. 1B, and by reference number 112, the calling device may be enabled to initiate a call to the user device. The caller may input a phone number into the calling device. Additionally, or alternatively, the caller may choose a stored contact in the calling device to call. For example, the caller may select to call a contact such as "Mom" stored by the calling device. The calling device may provide an input option (such as an input option that reads "Call Mom") to the caller to initiate the call to the contact "Mom."

As shown by reference number 114, the user device may receive an incoming call from the calling device. The user device may output an indication of the incoming call from the calling device. The indication of the incoming call may include a display of information regarding the incoming call (such as contact information if the contact information is stored by the user device, a phone number of the calling device, and/or the like). Additionally, or alternatively, the indication of the incoming call may provide incoming call options to the user. The incoming call options may include an option to answer the incoming call (e.g., to answer the call, to accept the call, to pick up the call, and/or the like), an option to deny the incoming call (e.g., to deny the call, to decline the call, to hang up the call, to reject the call, to ignore the call, and/or the like), an option to screen the incoming call (e.g., to screen the call, to request information from the caller, to ask why the caller is calling, and/or the like), and/or the like.

For this example, assume that the calling device is associated with the daughter of the user and the phone number is stored by the user device as a contact named "Daughter." The indication of the incoming call may include a display by the user device including the incoming call information, such as "Incoming call from Daughter." Additionally, or alternatively, the indication of the incoming call may the provide incoming call options to respond to the incoming call, such as "Answer" and/or "Screen". In some implementations, the user device may display the incoming call information and the options using the call screening service application or a plugin running in conjunction with the call screening service application to display the information on a screen of the user device. A plugin is a software component that performs a function, task, or activity. A plugin may include a computer program, an application, a process, a service, a microservice, and/or the like.

As shown by reference number 114, the user device may receive a request to screen the incoming call. The request may be received by the call screening service application running on the user device as a result of the user interacting with the incoming call option to screen the incoming call. Additionally, or alternatively, the call screening service application running on the user device may receive the request to screen the incoming call automatically based on the user preferences, the whitelist information, the blacklist information, a user device setting (e.g., do not disturb, away, and/or the like), and/or the like.

As shown by reference number 116, the user device may transmit a message to the calling device in response to the request to screen the incoming call. The message may indicate that the user of the user device is busy, is unable to answer the call, is screening the call, and/or the like. Additionally, or alternatively, the message may request that the caller state the purpose for the call. For example, the message transmitted to the calling device may be "Mom is busy. Say why you're calling." The message may be transmitted to the calling device as a voice message, an SMS message, a text message, a pre-recorded message, a generated message, and/or the like.

In some implementations, the caller of the calling device may state the purpose of the call into the calling device in response to the message. The caller may verbally respond to the calling device with a voice input into the calling device which includes the caller's purpose for making the call. For example, the caller may say "I need $20 for my field trip." The calling device may transmit the voice input to the user device.

As shown in FIG. 1B, and by reference number 118, the user device may receive and/or record the voice input. The user device may receive the voice input from the calling device. The user device may transcribe the voice input (e.g., convert the voice input into text using one or more speech-to-text models). The user device may store the voice input and the transcription of the voice input. In some implementations, and as shown in FIG. 1B, the user device may display the transcription of the voice input on the user device. In some implementations, the user device may not display the transcription of the voice input to the user. For example, the transcription of the voice input may be used for another purpose (such as determining and/or detecting the purpose of the call).

Figure 1C:
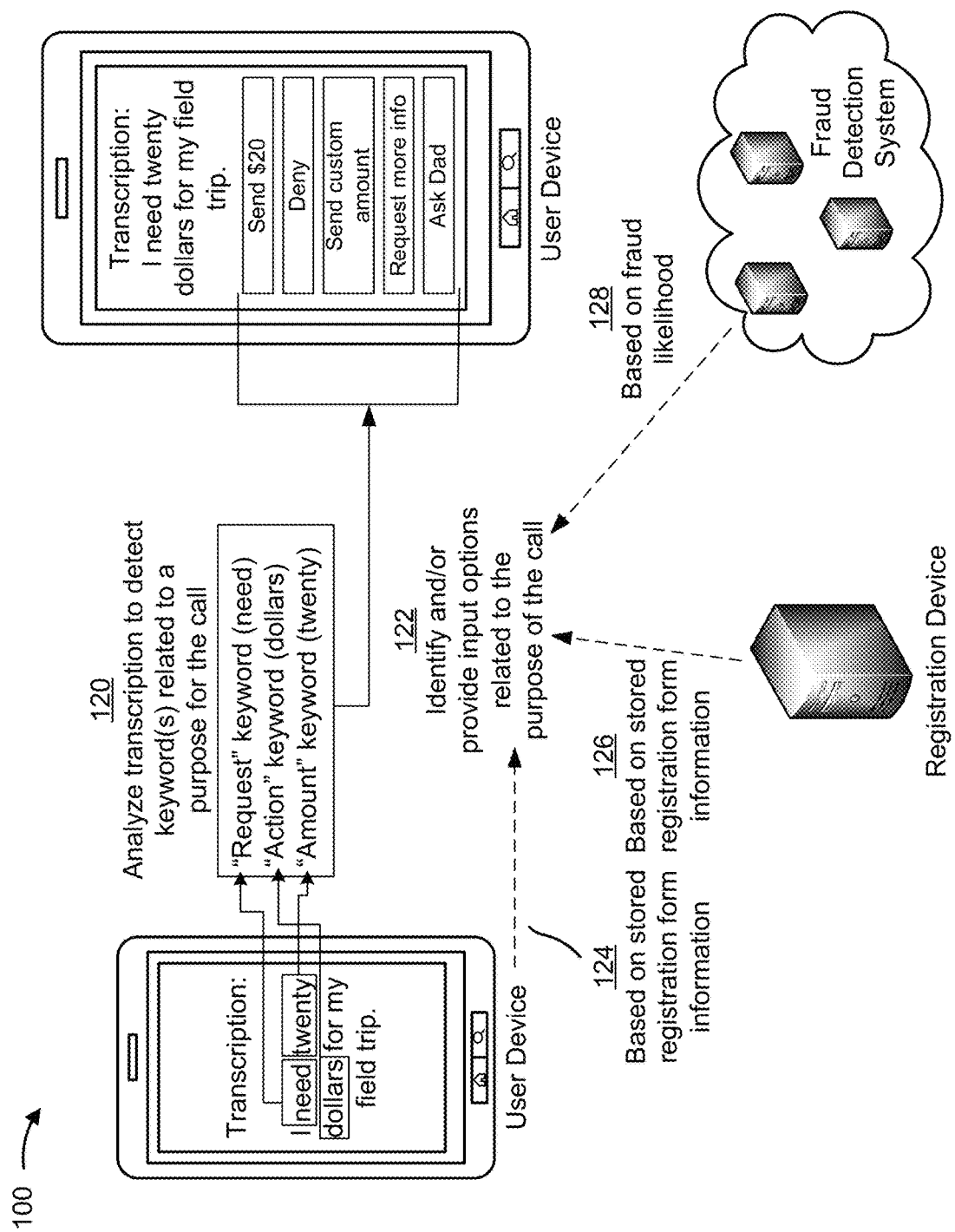

As shown in FIG. 1C, and by reference number 120, the user device may analyze the transcription of the voice input to detect one or more keywords in the transcription of the voice input. The one or more keywords may relate to and/or indicate the purpose for the call. The user device may analyze the transcription of the voice input to determine, detect, and/or identify keywords to determine the purpose for the call. In some implementations, the user device may use one or more natural language processing (NLP) techniques to analyze the transcription of the voice input to identify keywords.

The purpose for the call may be determined from a single keyword. In some implementations, the purpose for the call may be determined from a combination of keywords. For example, one or more keywords may indicate that the purpose for the call is to request that the user perform an action. The user device may store keywords that may indicate certain reasons for a call. In some implementations, the user device may use one or more machine learning models to identify keywords and/or the meaning of the keywords, such as one or more machine learning models described with regard to FIGS. 3 and 4 or one or more machine learning models trained in a manner similar to that described with regard to FIGS. 3 and 4.

In some implementations, the user device may categorize keywords based on the purpose the keywords relate to. For example, the user device may categorize keywords into categories, such as request keywords (e.g., keywords that indicate that the caller is making a request), action keywords (e.g., keywords that indicate an action to be performed), amount keywords (e.g., keywords that indicate a quantity being requested), time keywords (e.g., keywords that indicate a timeframe for completing an action), purpose keywords (e.g., keywords that explain the purpose for the request), and/or the like.

For example, the transcription of the voice input from the caller may indicate that the purpose of the call is a request for funds (e.g., the caller may be requesting that the user perform the action of sending funds to the caller). The user device may analyze the transcription to detect one or more keywords. The one or more keywords may fall within the categories of keywords, such as request keywords (such as need, send, give me, can I have, you owe me, and/or the like), action keywords (for this example, the action relates to the transfer of funds and action keywords may include keywords, such as dollars, bucks, euros, pounds, dinero, cash, money, currency, and/or the like), amount keywords (such as a numerical value), and/or the like.

For example, as shown in FIG. 1C, the transcription of the voice input from the caller may be "I need twenty dollars for my field trip." The user device may analyze the transcription for one or more keywords. The user device may detect a request keyword, such as "need," which indicates that the caller is making a request because the caller needs something. The user device may detect an action keyword, such as "dollars," which indicates that the action the caller is requesting is related to funds. The user device may detect an amount keyword, such as "twenty," which indicates the amount that is being requested by the caller. From this, the user device may determine that the purpose for the call is a request for funds. Additionally, or alternatively, the user device may determine the amount related to the purpose for the call (for this example, a numerical amount of funds).

As shown in FIG. 1C, and by reference number 122, the user device may identify and/or provide input options based on the purpose for the call. The input options may vary based on the purpose for the call. Input options may be associated with one or more actions. The input options may enable the user device to perform the action associated with the input option in response to the user interacting with one or more of the input options. The user device may identify and/or provide input options based on detecting keywords in the transcription of the voice input from the caller, based on registration form information stored by the user device, based on registration form information stored by the registration device, based on a fraud likelihood (e.g., a likelihood that the purpose for the call is fraudulent), and/or the like.

In some implementations, the user device may identify and/or provide input options based on one or more keywords detected in the transcription of the voice input from the caller. For example, in some implementations, the user device may identify and/or provide input options only if a request keyword is detected in the transcription of the voice input. The user device may identify and/or provide input options based on an action keyword detected in the transcription of the voice input. For example, if the user device detects an action keyword related to the transfer of funds, an input option provided may enable the user device to transmit a request that causes funds to be transferred from an account associated with the user to an account associated with the caller when the user selects the input option. Another input option may allow a user to manually input (e.g., touch input, voice input, and/or the like) a numeric value of the amount of funds to be transferred by interacting with this input option and/or the user device.

Additionally, or alternatively, the user device may identify and/or provide input options based on an amount keyword detected in the transcription of the voice input. For example, if the user device detects an amount keyword such as "twenty," the user device may provide an input option related to twenty units. The type of unit may be based on and/or related to an action keyword detected in the transcription of the voice input. For example, if the user device detects an action keyword related to the transfer of funds, the user device may provide an input option related to transferring twenty units of currency (the currency may be set in the user preferences and/or the currency may be detected in the transcription of the voice input of the caller) to be transferred from an account associated with the user to an account associated with the caller when the user selects with the input option. As such, if the amount keyword detected is "twenty" and the action keyword detected is "dollars," an input option may be labeled "Send $20." The user device may transmit a request that causes twenty dollars to be transferred from an account associated with the user to an account associated with the caller when the user selects the input option labeled "Send $20."

As shown by reference number 124, the user device may identify and/or provide input options related to the purpose of the call based on registration form information stored by the user device. For example, the user device may identify and/or provide input options based on registration form information stored by the user device, such as the registration information, the whitelist information (e.g., acceptable and/or approved callers), the blacklist information (e.g., non-approved callers), the user preferences, and/or the like.

As shown by reference number 126, the user device may identify and/or provide input options related to the purpose of the call based on registration form information stored by the registration device. For example, the user device may identify and/or provide input options based on registration form information stored by the registration device, such as the registration information, the whitelist information (e.g., acceptable and/or approved callers), the blacklist information (e.g., non-approved callers), the user preferences, and/or the like.

In some implementations, the user device may provide input options only if the input options satisfy the user preferences stored by the user device and/or the registration device. For example, the user device may determine that a user preference indicates that requests for funds may come from callers only if the information associated with the calling device of the caller is listed in the whitelist information. If the user device determines that the information associated with the calling device of the caller is listed in the whitelist information, the user device may provide input options related to the purpose for the call (in this example, a request for funds) because the user preference has been satisfied.

As shown in FIG. 1C, and by reference number 128, the user device may identify and/or provide input options related to the purpose of the call based on the fraud likelihood. Fraud likelihood may be the likelihood that the purpose of the call (such as a request to perform an action) is fraudulent. The fraud detection system may determine the fraud likelihood. The fraud detection system may calculate a fraud score indicating the likelihood that the purpose for the call is fraudulent. The user device may identify and/or provide input options indicating that there is a likelihood of fraud (e.g., there is a likelihood of fraud when the fraud score satisfies a threshold). Additionally, or alternatively, the user device may provide no input options if there is a likelihood of fraud. In some implementations, the user device may provide an indication (such as an alert, a popup, a notification, and/or the like) along with input options if there is a likelihood of fraud. The fraud detection system and the calculation of the fraud score will be discussed in more detail herein in connection with FIGS. 2A and 2B.

The call screening service application running on the user device may provide input options based on the purpose of the call, the stored registration form information, and/or the fraud likelihood. Input options may include: an input option to transfer funds equal to a numeric amount detected in the transcription of the voice input; an input option to transfer a different amount of funds than the numeric amount detected in the transcription of the voice input; an input option to input a custom amount of funds to be transferred; an input option to deny transfer of funds; an input option to request additional information regarding the request for funds; an input option to block the calling device; an input option to report the calling device as spam; an input option to add the information associated with the calling device to the whitelist information; an input option to add the information associated with the calling device to the blacklist information; an input option to update user preferences; an input option to request that the caller of the calling device register with the custom call screening service application; an input option to perform an action; an input option to request that the caller of the calling device perform an action; an input option to request that the caller contact a third party; an input option to provide authentication (such as providing a biometric scan, providing a personal identification number (PIN), providing a password, and/or the like) before an action is performed based on the request detected in the transcription of the voice input; and/or the like. These input options are intended merely as examples. In practice, the user device may provide additional input options, fewer input options, and/or different input options than identified above. In some implementations, the user may be permitted to configure which input options, how many input options, and/or the like are presented for display by the user device.

Figure 1D:
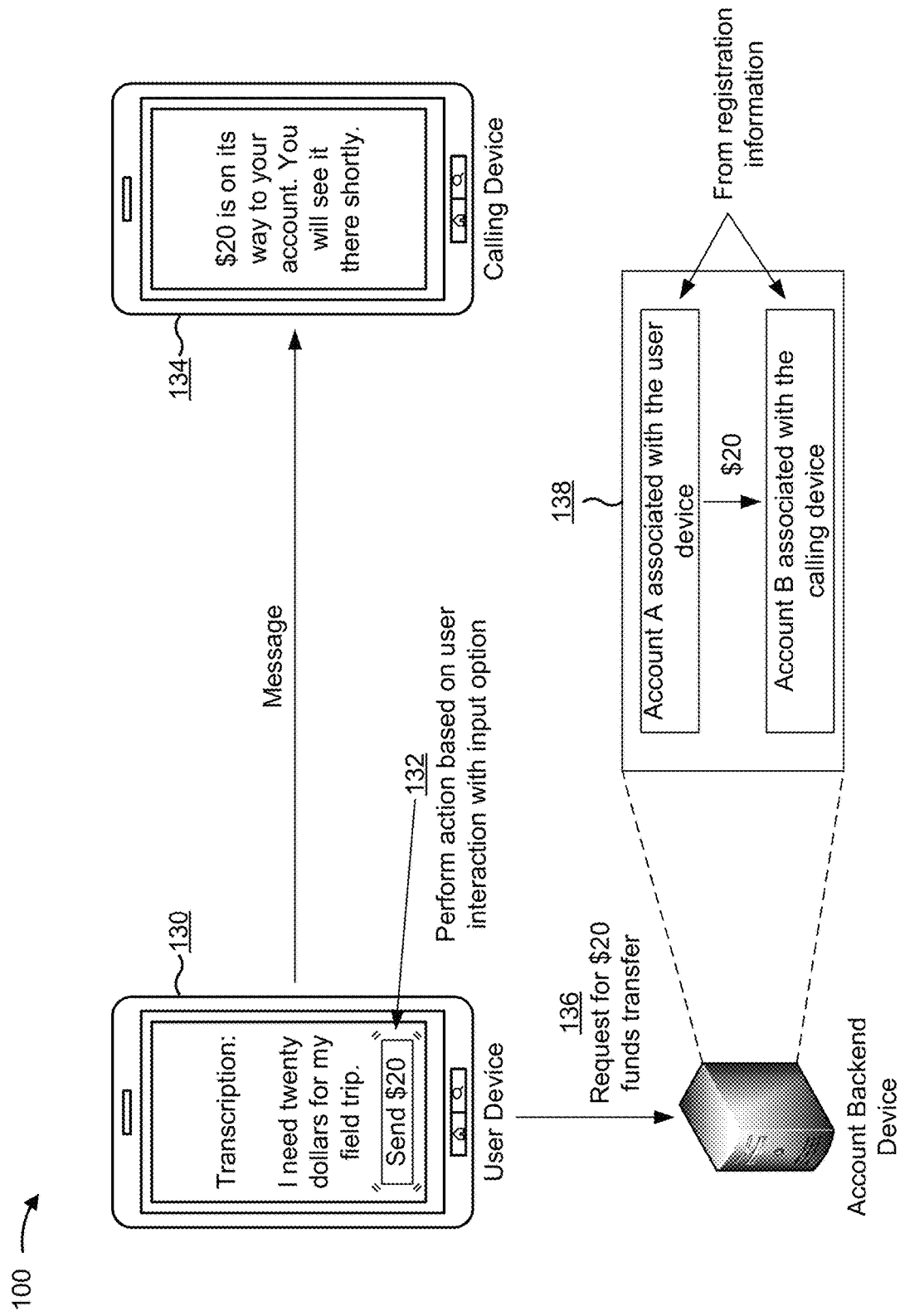

As shown in FIG. 1D, and by reference number 130, the user device may display the transcription of the voice input from the caller along with one or more input options based on the purpose of the call. In some implementations, the user device may display only the one or more input options. The user of the user device may interact with one or more of the input options. For example, the user may select an input option by interacting (e.g., tapping, swiping, touching, clicking, providing a voice input, and/or the like) with the input option.

As shown by reference number 132, the user device may perform an action based on the user interacting with the one or more input options. The user device may perform the action associated with the one or more input options that the user interacts with. For example, an input option may be labeled "Send $20." The action associated with the input option labeled "Send $20" may be transmitting a request that causes twenty dollars to be transferred from an account associated with the user to an account associated with the caller.

In some implementations, the user device may be enabled to perform the action based on the user performing a single interaction (e.g., a single click, a single tap, a single swipe, a single gesture, a single voice input, and/or the like) with a specific input option. Enabling the user device to perform the action based on the user performing a single interaction eliminates the need for the user device to perform additional actions to complete the action requested by the caller. For example, the user device conserves computing resources that would have otherwise been used to unlock or open the user device, locate an appropriate service provider that is capable of performing the action, download and/or execute an application on the user device, and/or request or initiate performance of the action and/or a separate device (separate from the user device) conserves computing resources that would otherwise have been used to locate an appropriate service provider that is capable of performing the action, download and/or execute an application on the separate device, and/or request or initiate performance of the action.

As shown by reference number 134, the user device may transmit a message to the calling device when a user interacts with an input option. The message may indicate the action associated with the input option. For example, the action associated with the input option that the user interacts with may be transmitting a request that causes funds to be transferred from an account associated with the user to an account associated with the caller. The message may indicate that the funds requested by the caller in the voice input are being sent to the caller. Additionally, or alternatively, the message may indicate additional information, such as a numerical amount indicating the amount of funds which are to be transferred, a timeline in which the action will be performed, and/or the like.

Additionally, or alternatively, the message may indicate or request that the caller provide additional information. For example, the message may indicate that an action associated with the input option the user interacts with will be performed, but the call screening service application requests additional information (such as registration form information, account identifier information, and/or the like). The message may request that the caller register with the call screening service application. In some implementations, the user device may not perform the action until the additional information is received by the calling device, the registration device, and/or the account backend device.

Additionally, or alternatively, the message may request authentication information. The authentication information may be information to authenticate the identity of the caller. For example, the authentication information may be a password, a biometric scan, a PIN, and/or the like. In some implementations, the user device and/or the registration device may receive the authentication information and compare the authentication information with stored information to authenticate the identity of the caller. If the identity of the caller is authenticated (e.g., if the authentication information provided by the caller matches the stored authentication information), then the user device and/or the registration device may allow the action requested by the caller to be performed. If the identity of the caller is not authenticated (e.g., if the authentication information provided by the caller does not match the stored authentication information), then the user device and/or the registration device may not allow the action requested by the caller to be performed. In some implementations, the user device and/or the registration device may require the identity of the caller to be authenticated before performing any action associated with the purpose of the call.

Authenticating the identity of the caller adds an additional level of security to any action performed by the call screening service application, the user device, and/or the registration device. Authenticating the identity of the caller before performing any action associated with the purpose of the call reduces the risk that the caller has mispresented the caller's identity and allows for early identification of fraudulent activity. Authenticating the identity of the caller before performing any action associated with the purpose of the call allows the user device and/or the registration device to conserve computing resources that would have otherwise been used to perform the action, identify the fraudulent activity, investigate the fraudulent activity, and/or report the fraudulent activity. The service provider associated with the action may also conserve computing resources that would have otherwise been used to reverse the fraudulent activity for the user, and/or identify, detect, and diagnose the fraudulent activity.

As shown in FIG. 1D, and by reference number 136, the user device may cause the action to be performed in conjunction with the account backend device. The user device may communicate with the account backend device. The user device may transmit a request to the account backend device to perform an action. The account backend device may be associated with a service provider. The service provider may be a financial institution, a mobile payment company, a delivery company, an ordering company, a retailer, a ridesharing company, and/or the like.

The account backend device may store account information (such as account identifier information, user information, device information, and/or the like) related to the service provider. The account information may be associated with an account. For example, when a user registers for an account with the service provider, the account information may be provided by or to the user and associated with the account of the user. The account information may be stored by the account backend device.

The account backend device may receive the request from the user device to perform the action. The request from the user device may include user information (such as user device information, user account identifier information, user registration form information, user login information, and/or the like). Additionally, or alternatively, the request from the user device may include caller information (such as calling device information, caller account identifier information, caller registration form information, and/or the like). In some implementations, the communication between the user device and/or the calling device and the account backend device is secure (e.g., encrypted). Additionally, or alternatively, the account backend device may receive the caller information from the calling device.

As shown in FIG. 1D, and by reference number 138, the account backend device may perform the action requested by the user device in response to receiving the request transmitted by the user device. The account backend device may communicate with the user device and/or the calling device if the account backend device is unable to perform the action. For example, the account backend device may require additional information to perform the action. The account backend device may transmit a request to the user device and/or the calling device for the additional information required. For example, the account backend device may search for an account associated with the user device and/or the calling device. If the account backend device is unable to locate an account associated with the user device and/or the calling device, the account backend device may transmit a message to the user device and/or the calling device that no account was found that was associated with the user device and/or the calling device. The account backend device may transmit a request to the user device and/or the calling device to register for an account with the service provider associated with the account backend device.

For this example, assume that the user device transmits a request to the account backend device that is a request to transfer funds from an account associated with the user device to an account associated the calling device. Additionally, or alternatively, the request may include the user device information and the calling device information. The request may include an amount to be transferred from the account associated with the user device to the account associated with the calling device. The account backend device may receive the request. The account backend device may process the request by searching for the account associated with the user device and the account associated with the calling device using the user device information and the calling device information. The account backend device may search for the account associated with the user device and the account associated with the calling device by searching accounts stored by the account backend device.

The account backend device may locate the account associated with the user device and the account associated with the calling device. The account backend device may transfer the amount of funds requested from the account associated with the user device to the account associated with the calling device. In this example, the amount request to be transferred is twenty dollars. As such, the account backend device may cause twenty dollars to be transferred from the account associated with the user device to the account associated with the calling device.

The account backend device may transmit a message to the user device and/or the calling device that the action was performed successfully. The account device may transmit a message to the user device and/or the calling device that the account backend device was unable to perform the action. For example, the account associated with the user device may have insufficient funds to perform the requested action. As such, the account backend device may transmit a message to the user device and/or the calling device indicating that the account associated with the user device has insufficient funds to complete the request. The account backend device may transmit a request to the user device to add additional funds to the account associated with the user device. Additionally, or alternatively, the account backend device may transmit a request to the user device and/or the calling device to change the amount of funds requested.

Some implementations described herein enable the user device to conserve computing resources that would have otherwise been used to unlock or open the user device, locate an appropriate service provider that is capable of performing the action, download and/or execute an application on the user device, and/or request or initiate performance of the action and/or a separate device (separate from the user device) to conserve computing resources that would otherwise have been used to locate an appropriate service provider that is capable of performing the action, download and/or execute an application on the separate device, and/or request or initiate performance of the action.

As indicated above, FIGS. 1A-1D are provided as one or more examples. Other examples may differ from what is described with regard to FIGS. 1A-1D. The number and arrangement of devices shown in FIGS. 1A-1D are provided as one or more examples. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) of FIGS. 1A-1D may perform one or more functions described as being performed by another set of devices of FIGS. 1A-1D.

Figure 2A:
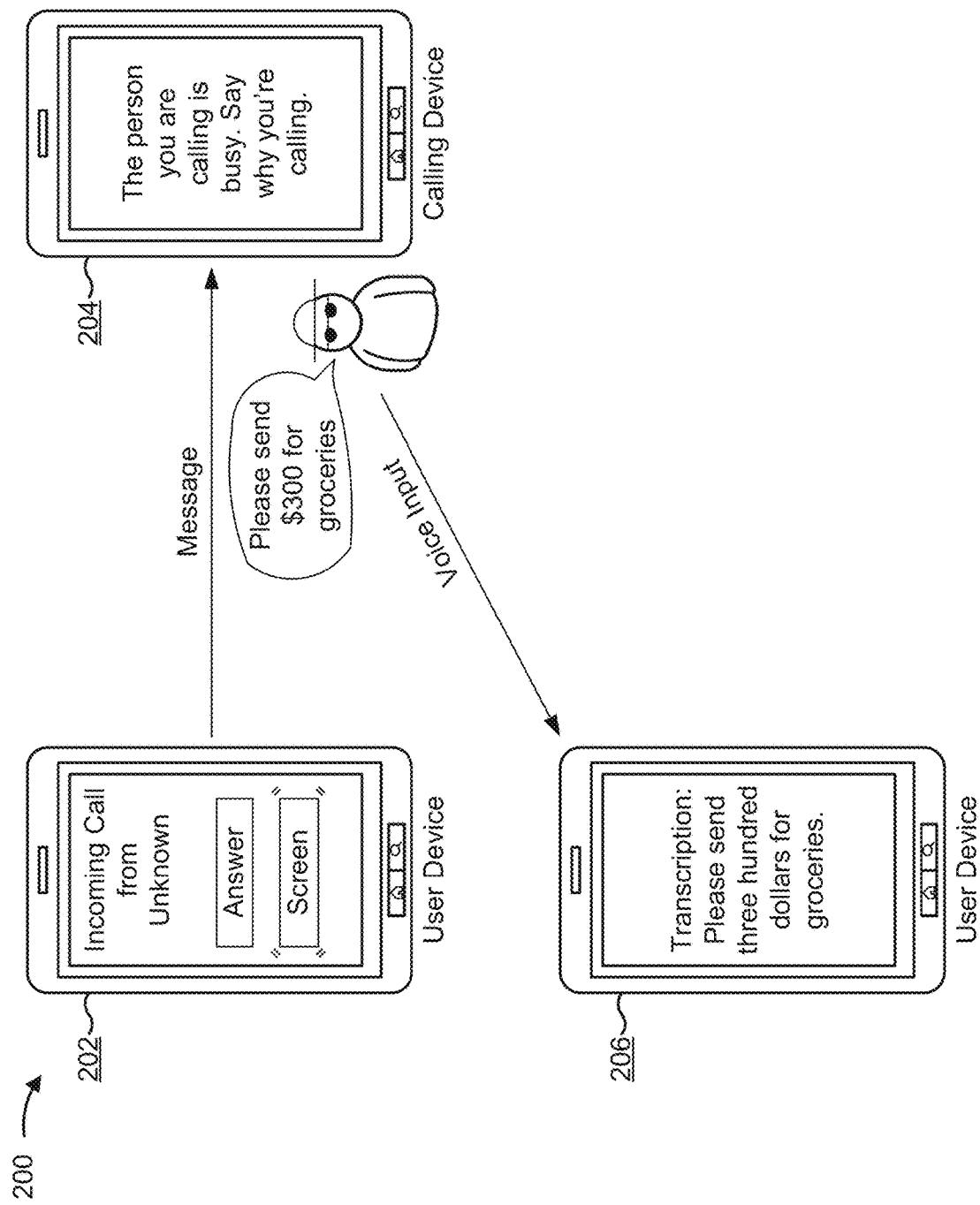
FIGS. 2A and 2B are diagrams of another one or more example implementations described herein.
Figure 2B:
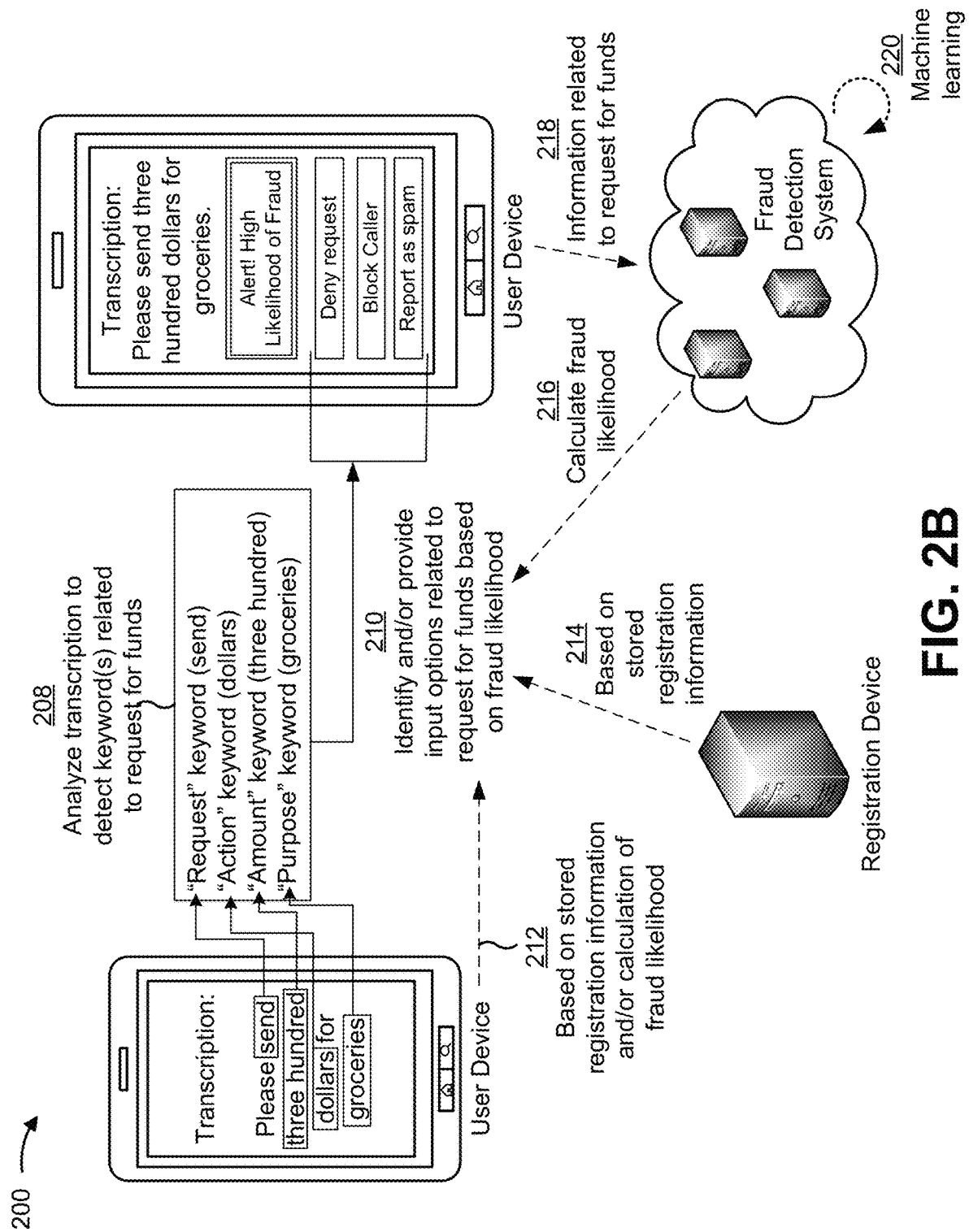

FIGS. 2A and 2B are diagrams of one or more example implementations 200 described herein. As shown in FIGS. 2A and 2B, a user device may be associated with a registration device, a calling device, and a fraud detection system. A user of the user device may interact with the user device to register for a custom call screening service with the registration device. The custom call screening service may enable the user device to perform a custom action based on a purpose of a voice call received by the user device from the calling device. In the description below, an example of the custom action is described as transferring funds from an account associated with the user of the user device to an account associated with a caller of the calling device. In some implementations, the custom action may be something other than transferring funds, such as scheduling a service (such as a car service, a cleaning service, a food delivery service, and/or the like), ordering a product, scheduling a meeting, and/or the like. In some implementations, the user of the user device may be permitted to configure the type of custom action to be performed. For example, the user may be permitted to select the custom action from a plurality of potential custom actions, define a unique custom action, and/or the like.

As shown in FIG. 2A, and by reference number 202, the user device may receive an incoming call from the calling device. The user device may output an indication of the incoming call from the calling device. The indication of the incoming call may include a display of information regarding the incoming call (such as contact information if the contact information is stored by the user device, a phone number of the calling device, and/or the like). Additionally, or alternatively, the indication of the incoming call may provide incoming call options to the user. The incoming call options may include an option to answer the incoming call (e.g., to answer the call, to accept the call, to pick up the call, and/or the like), an option to deny the incoming call (e.g., to deny the call, to decline the call, to hang up the call, to reject the call, to ignore the call, and/or the like), an option to screen the incoming call (e.g., to screen the call, to request information from the caller, to ask why the caller is calling, and/or the like), and/or the like.

For this example, assume that the calling device is associated with a caller that is unknown to the user and that the phone number associated with the calling device is not stored in the user device. The indication of the incoming call may include the incoming call information, such as "Incoming Call from Unknown." Additionally, or alternatively, the indication of the incoming call may provide incoming call options to respond to the incoming call, such as "Answer" and/or "Screen." In some implementations, the user device may display the incoming call information and the call options using the call screening service application or a plugin running in conjunction with the call screening service application to display the information on a screen of the user device. A plugin is a software component that performs a function, task, or activity. A plugin may include a computer program, an application, a process, a service, a microservice, and/or the like.

As shown by reference number 202, the user device may receive a request to screen the incoming call. The request may be received by the call screening service application running on the user device as a result of the user interacting with the incoming call option to screen the incoming call. Additionally, or alternatively, the call screening service application running on the user device may receive the request to screen the incoming call automatically based on user preferences, whitelist information (e.g., approved callers), blacklist information (e.g., non-approved callers), a user device setting (e.g., do not disturb, away, and/or the like), and/or the like. The user preferences, the whitelist information, and/or the blacklist information may be the same as described above with respect to FIGS. 1A-1D. In some implementations, the user preferences, the whitelist information, and/or the blacklist information may be obtained by the user device in a manner similar to that as described above with respect to FIGS. 1A-1D.

As shown by reference number 204, the user device may transmit a message to the calling device in response to the request to screen the incoming call. The message may indicate that the user of the user device is busy, is unable to answer the call, is screening the call, and/or the like. Additionally, or alternatively, the message may request that the caller state the purpose for the call. For example, the message transmitted to the calling device may be "The person you are calling is busy. Say why you're calling." The message may be transmitted to the calling device as a voice message, an SMS message, a text message, a pre-recorded message, a generated message, and/or the like.

In some implementations, the caller of the calling device may state the purpose of the call into the calling device in response to the message. The caller may verbally respond to the calling device with a voice input into the calling device which includes the caller's purpose for making the call. For example, the caller may say "Please send $300 for groceries." The calling device may transmit the voice input to the user device.

As shown in FIG. 2A, and by reference number 206, the user device may receive and/or record the voice input. The user device may receive the voice input from the calling device. The user device may transcribe the voice input (e.g., convert the voice input into text using one or more speech-to-text models). The user device may store the voice input and the transcription of the voice input. In some implementations, and as shown in FIG. 2A, the user device may display the transcription of the voice input on the user device. In some implementations, the user device may not display the transcription of the voice input to the user. For example, the transcription of the voice input may be used for another purpose (such as determining and/or detecting the purpose of the call).

As shown in FIG. 2B, and by reference number 208, the user device may analyze the transcription of the voice input to detect one or more keywords in the transcription of the voice input. The one or more keywords may relate to and/or indicate the purpose for the call. The user device may analyze the transcription of the voice input to determine, detect, and/or identify keywords to determine the purpose for the call. In some implementations, the user device may use one or more natural language processing (NLP) techniques to analyze the transcription of the voice input to identify keywords.

The purpose for the call may be determined from a single keyword. In some implementations, the purpose for the call may be determined from a combination of keywords. For example, one or more keywords may indicate that the purpose for the call is to request that the user perform an action. The user device may store keywords that may indicate certain reasons for a call. In some implementations, the user device may use one or more machine learning models to identify keywords and/or the meaning of the keywords, such as one or more machine learning models described with regard to FIGS. 3 and 4 or one or more machine learning models trained in a manner similar to that described with regard to FIGS. 3 and 4.

In some implementations, the user device may categorize keywords based on the purpose the keywords relate to. For example, the user device may categorize keywords into categories, such as request keywords (e.g., keywords that indicate that the caller is making a request), action keywords (e.g., keywords that indicate an action to be performed), amount keywords (e.g., keywords that indicate a quantity being requested), time keywords (e.g., keywords that indicate a timeframe for completing an action), purpose keywords (e.g., keywords that explain the purpose for the request), and/or the like.

For example, the transcription of the voice input from the caller may indicate that the purpose of the call is a request for funds (e.g., the caller may be requesting that the user perform the action of sending funds to the caller). The user device may analyze the transcription to detect one or more keywords. The one or more keywords may fall within the categories of keywords, such as request keywords (such as need, send, give me, can I have, you owe me, and/or the like), action keywords (for this example, the action relates to the transfer of funds and action keywords may include keywords, such as dollars, bucks, euros, pounds, dinero, cash, money, currency, and/or the like), amount keywords (such as a numerical value), purpose keywords (such as field trip, groceries, gas, emergency, food, and/or the like), and/or the like.

For example, as shown in FIG. 2B, the transcription of the voice input from the caller may be "Please send three hundred dollars for groceries." The user device may analyze the transcription for one or more keywords. The user device may detect a request keyword, such as "send," which indicates that the caller is making a request because the caller wants something sent. The user device may detect an action keyword, such as "dollars," which indicates that the action the caller is requesting is related to funds. The user device may detect an amount keyword, such as "three hundred," which indicates the amount that is being requested by the caller. The user device may detect a purpose keyword, such as "groceries," which indicates the purpose for the call and/or the request. From this, the user device may determine that the purpose for the call is a request for funds for groceries. Additionally, or alternatively, the user device may determine the amount related to the purpose for the call (for this example, a numerical amount of funds).

As shown in FIG. 2B, and by reference number 210, the user device may identify and/or provide input options based on a fraud likelihood (e.g., a likelihood that the purpose for the call is fraudulent). The input options may vary based on the purpose for the call, based on registration form information, and/or based on a fraud likelihood of the purpose for the call. The input options may vary based on registration form information stored by the registration device. The registration form information may be similar to the registration form information discussed above with respect to FIGS. 1A-1D.

Input options may be associated with one or more actions. The input options may enable the user device to perform the action associated with the input option in response to the user interacting with one or more of the input options. The user device may identify and/or provide input options based on detecting keywords in the transcription of the voice input from the caller, based on registration form information stored by the user device, based on registration form information stored by the registration device, based on a fraud likelihood, and/or the like.

In some implementations, the user device may identify and/or provide input options based on one or more keywords detected in the transcription of the voice input from the caller. For example, in some implementations, the user device may identify and/or provide input options only if a request keyword is detected in the transcription of the voice input. The user device may identify and/or provide input options based on an action keyword detected in the transcription of the voice input. For example, if the user device detects an action keyword related to the transfer of funds, an input option provided may enable the user device to transmit a request that causes funds to be transferred from an account associated with the user to an account associated with the caller when the user selects the input option. Another input option may allow a user to manually input (e.g., touch input, voice input, and/or the like) a numeric value of the amount of funds to be transferred by interacting with this input option and/or the user device.

Additionally, or alternatively, the user device may identify and/or provide input options based on an amount keyword detected in the transcription of the voice input. For example, if the user device detects an amount keyword such as "three hundred," the user device may provide an input option related to three hundred units. The type of unit may be based on and/or related to an action keyword detected in the transcription of the voice input. For example, if the user device detects an action keyword related to the transfer of funds, the user device may provide an input option related to transferring three hundred units of currency (the currency may be set in the user preferences and/or the currency may be detected in the transcription of the voice input of the caller) to be transferred from an account associated with the user to an account associated with the caller when the user selects with the input option. As such, if the amount keyword detected is "three hundred" and the action keyword detected is "dollars," an input option may be labeled "Send $300." The user device may transmit a request that causes three hundred dollars to be transferred from an account associated with the user to an account associated with the caller when the user selects the input option labeled "Send $300."

As shown by reference number 212, the user device may identify and/or provide input options related to the purpose of the call based on registration form information stored by the user device and/or the calculation of fraud likelihood. For example, the user device may identify and/or provide input options based on registration form information stored by the user device, such as the registration information, the whitelist information (e.g., acceptable and/or approved callers), the blacklist information (e.g., non-approved callers), the user preferences, and/or the like.

As shown by reference number 214, the user device may identify and/or provide input options related to the purpose of the call based on registration form information stored by the registration device. For example, the user device may identify and/or provide input options based on registration form information stored by the registration device, such as the registration information, the whitelist information (e.g., acceptable and/or approved callers), the blacklist information (e.g., non-approved callers), the user preferences, and/or the like.

In some implementations, the user device may provide input options only if the input options satisfy the user preferences stored by the user device and/or the registration device. For example, the user device may determine that a user preference indicates that requests for funds may come from callers only if the information associated with the calling device of the caller is listed in the whitelist information. If the user device determines that the information associated with the calling device of the caller is listed in the whitelist information, the user device may provide input options related to the purpose for the call (in this example, a request for funds) because the user preference has been satisfied.

As shown in FIG. 2B, and by reference number 216, the user device and/or the fraud detection system may calculate a fraud likelihood. Fraud likelihood may be the likelihood that the purpose of the call (such as a request to perform an action) is fraudulent. The fraud detection system may determine the fraud likelihood. The fraud detection system may calculate a fraud score indicating the likelihood that the purpose for the call is fraudulent. The user device may identify and/or provide input options indicating that there is a likelihood of fraud (e.g., there is a likelihood of fraud when the fraud score satisfies a threshold). Additionally, or alternatively, the user device may provide no input options if there is a likelihood of fraud. In some implementations, the user device may provide an indication (such as an alert, a popup, a notification, and/or the like) along with input options if there is a likelihood of fraud.

The fraud likelihood may be based on the fraud score. The fraud score may be calculated by the fraud detection system. As shown in FIG. 2B, and by reference number 220, fraud detection system may use machine learning to determine the fraud score based on one or more inputs into the fraud detection system. In some implementations, the fraud detection system may use one or more machine learning models to calculate the fraud score, such as one or more machine learning models described with regard to FIGS. 3 and 4 or one or more machine learning models trained in a manner similar to that described with regard to FIGS. 3 and 4.

As shown in FIG. 2B, and by reference number 218, the inputs into the fraud detection system may include: an amount of funds requested by the caller; a number of fund requests made by the caller; a number of fund requests associated with the calling device; whether a phone number associated with the calling device has been previously reported (e.g., reported as spam, reported as suspicious by one or more other users, blocked by one or more other users, and/or the like); whether the phone number associated with the calling device is listed in whitelist information; whether the phone number associated with the calling device is listed in blacklist information; an amount of requests made by the caller and/or the calling device within a certain time period; whether voice biometrics of the caller match a stored voiceprint associated with the caller; whether the reasons provided for the call in a transcription of a voice input match flagged fraud keywords (e.g., words that have been previously flagged as indicating a likelihood of fraud); whether the calling device has previously made a call to the user device; a predicted location of the calling device (based on an area code of the phone number associated with the calling device, based on location tracking information of the calling device, and/or the like); whether the phone number associated with the calling device is identified in the contact list associated with the user device; whether the calling device is registered with the call screening service application; whether the calling device is registered with a call screening service application account associated with the user device; one or more user preferences; an identity verification procedure (such as the identity authentication discussed above with respect to FIGS. 1A-1D) performed in association with at least one of the user device or the calling device; information received from the fraud detection system; and/or the like. These input into the fraud detection system are intended merely as examples. In practice, the fraud detection system may base the fraud likelihood on additional input options, fewer input options, and/or different input options than identified above. In some implementations, the user may be permitted to configure which inputs, how many inputs, and/or the like are presented for used by the fraud detection system to determine the fraud likelihood and/or the fraud score.

The fraud detection system may communicate with the user device. In some implementations, the fraud detection system may part of the user device. In some implementations, the fraud detection system may be included with the call screening service application. The fraud detection system may be running on the user device.

The user device may identify and/or provide input options based on the fraud score calculated by the fraud detection system. In some implementations, the user device may provide input options only if the fraud score satisfies a threshold fraud score (e.g., indicative of a low likelihood of fraud). Fraud scores that do not satisfy the threshold fraud score may be indicative of a high likelihood of fraud.

The user device may provide certain input options only if the fraud score does not satisfy the threshold fraud score. For example, if fraud detection system calculates a fraud score that does not satisfy the threshold fraud score, then the user device may provide input options that relate to blocking and/or reporting the caller. In some implementations, if fraud detection system calculates a fraud score that does not satisfy the threshold fraud score, then the user device may not provide any input options that allow the user to accept the request and/or perform the action. In some implementations, if fraud detection system calculates a fraud score that does not satisfy the threshold fraud score, then the user device may provide an indication (such as an alert, a popup, a flag, a change of color, a change in the display, and/or the like) that there is a high likelihood of fraud. In some implementations, the user device may require additional authentication (such as multi-factor authentication (MFA)) from the caller of the calling device if the fraud score calculated by the fraud detection platform does not satisfy the threshold fraud score.

In the example discussed above, the user device may analyze the transcription of the voice input to detect that the purpose of the call is to request three hundred dollars for groceries. The fraud detection system may detect that there is a high likelihood of fraud based on the purpose detected, the caller identification, the calling device history (e.g., how many times the calling device has called the user device, how many requests the calling device has made, the frequency of requests made by the calling device, and/or the like), user preferences, and/or the like. For example, the fraud detection platform may determine that there is a high likelihood of fraud because a phone number associated with a calling device that is not saved in the contacts of the user device is requesting funds for groceries. The fraud detection system may determine that the purpose of groceries should be requested only by phone numbers stored by the user in the user's contacts. Additionally, or alternatively, the fraud detection system may determine that the amount requested does not satisfy a threshold amount for the purpose detected (e.g., the amount of three hundred dollars does not satisfy the threshold amount for the purpose of groceries).

The call screening service application running on the user device may provide input options based on the purpose of the call, the stored registration form information, and/or the fraud likelihood. Input options may include: an input option to transfer funds equal to a numeric amount detected in the transcription of the voice input; an input option to transfer a different amount of funds than the numeric amount detected in the transcription of the voice input; an input option to input a custom amount of funds to be transferred; an input option to deny transfer of funds; an input option to request additional information regarding the request for funds; an input option to block the calling device; an input option to report the calling device as spam; an input option to add the information associated with the calling device to the whitelist information; an input option to add the information associated with the calling device to the blacklist information; an input option to update user preferences; an input option to request that the caller of the calling device register with the custom call screening service application; an input option to perform an action; an input option to request that the caller of the calling device perform an action; an input option to request that the caller contact a third party; an input option to provide authentication (such as providing a biometric scan, providing a personal identification number (PIN), providing a password, and/or the like) before an action is performed based on the request detected in the transcription of the voice input; and/or the like. These input options are intended merely as examples. In practice, the user device may provide additional input options, fewer input options, and/or different input options than identified above. In some implementations, the user may be permitted to configure which input options, how many input options, and/or the like are presented for display by the user device.

Some implementations described herein may enable a user device to identify a fraudulent request prior to the user device providing an option, for performing the custom action, to be displayed by the call screening service on the display of the user device. As a result, the user device may conserve computing resources that would have otherwise been used to perform the action, identify the fraudulent activity, investigate the fraudulent activity, and/or report the fraudulent activity. A service provider associated with the action may also conserve computing resources that would have otherwise been used to reverse the fraudulent activity for the user, and/or identify, detect, and diagnose the fraudulent activity.

As indicated above, FIGS. 2A and 2B are provided as one or more examples. Other examples may differ from what is described with regard to FIGS. 2A and 2B. The number and arrangement of devices shown in FIGS. 2A and 2B are provided as one or more examples. In practice, there may be additional devices, fewer devices, different devices, or differently arranged devices than those shown in FIGS. 2A and 2B. Furthermore, two or more devices shown in FIGS. 2A and 2B may be implemented within a single device, or a single device shown in FIGS. 2A and 2B may be implemented as multiple, distributed devices. Additionally, or alternatively, a set of devices (e.g., one or more devices) of FIGS. 2A and 2B may perform one or more functions described as being performed by another set of devices of FIGS. 2A and 2B.

Figure 3:
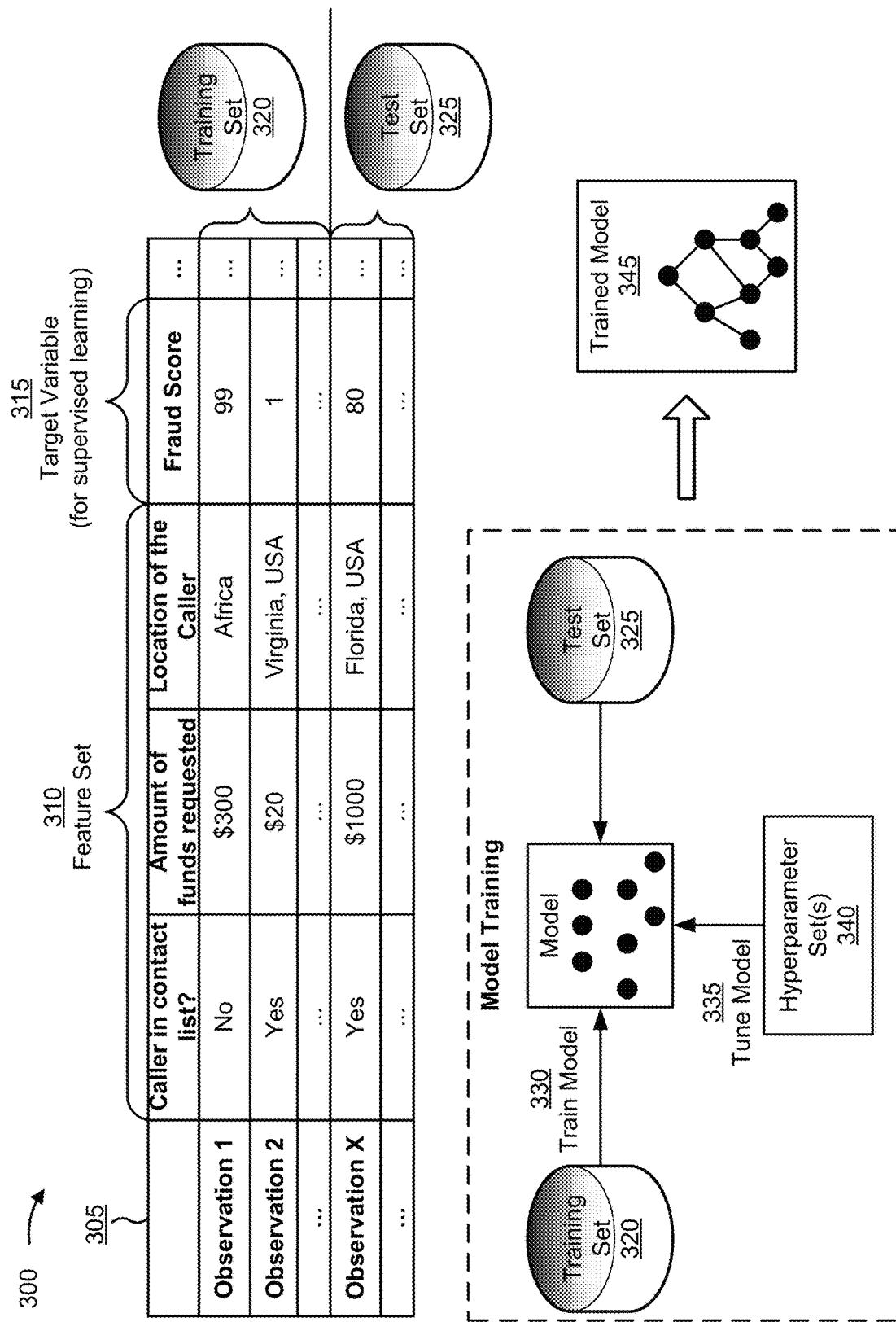
FIGS. 3 and 4 are diagrams of another one or more example implementations described herein.

FIG. 3 is a diagram illustrating an example 300 of training a machine learning model. The machine learning model training described herein may be performed using a machine learning system. The machine learning system may include a computing device, a server, a cloud computing environment, and/or the like, such as a fraud detection system, a user device, a calling device, a registration device, and/or an account backend device.

As shown by reference number 305, a machine learning model may be trained using a set of observations. The set of observations may be obtained and/or input from historical data, such as data gathered during one or more processes described herein. For example, the set of observations may include data gathered from user interaction with and/or user input to determine a fraud score, as described elsewhere herein. In some implementations, the machine learning system may receive the set of observations (e.g., as input) from a fraud detection system, a user device, a calling device, a registration device, and/or an account backend device.

As shown by reference number 310, a feature set may be derived from the set of observations. The feature set may include a set of variable types. A variable type may be referred to as a feature. A specific observation may include a set of variable values corresponding to the set of variable types. A set of variables values may be specific to an observation. In some cases, different observations may be associated with different sets of variable values, sometimes referred to as feature values. In some implementations, the machine learning system may determine variable values for a specific observation based on input received from a fraud detection system, a user device, a calling device, a registration device, and/or an account backend device. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from a fraud detection system, a user device, a calling device, a registration device, and/or an account backend device, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of whether a caller is in a contact list, a second feature of an amount of funds requested by the caller, a third feature of a location of the caller, and so on. As shown, for a first observation, the first feature may have a value of "No," the second feature may have a value of "$300," the third feature may have a value of "Africa," and so on. These features and feature values are provided as examples, and may differ in other examples. For example, the feature set may include one or more of the following features: an amount of funds requested by the caller; a number of fund requests made by the caller; a number of fund requests associated with the calling device; whether a phone number associated with the calling device has been previously reported (e.g., reported as spam, reported as suspicious by one or more other users, blocked by one or more other users, and/or the like); whether the phone number associated with the calling device is listed in whitelist information; whether the phone number associated with the calling device is listed in blacklist information; an amount of requests made by the caller and/or the calling device within a certain time period; whether voice biometrics of the caller match a stored voiceprint associated with the caller; whether the reasons provided for the call in a transcription of a voice input match flagged fraud keywords (e.g., words that have been previously flagged as indicating a likelihood of fraud); whether the calling device has previously made a call to the user device; a predicted location of the calling device (based on an area code of the phone number associated with the calling device, based on location tracking information of the calling device, and/or the like); whether the phone number associated with the calling device is identified in the contact list associated with the user device; whether the calling device is registered with the call screening service application; whether the calling device is registered with a call screening service application account associated with the user device; one or more user preferences; an identity verification procedure (such as the identity authentication discussed above with respect to FIGS. 1A-1D) performed in association with at least one of the user device or the calling device; information received from the fraud detection system; and/or the like. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory, and/or the like) used to train the machine learning model.

As shown by reference number 315, the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values. As shown in the example of FIG. 3, the target variable may correspond to a fraud score.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 320 that includes a first subset of observations, of the set of observations, and a test set 325 that includes a second subset of observations of the set of observations. The training set 320 may be used to train (e.g., fit, tune, and/or the like) the machine learning model, while the test set 325 may be used to evaluate a machine learning model that is trained using the training set 320. For example, for supervised learning, the test set 320 may be used for initial model training using the first subset of observations, and the test set 325 may be used to test whether the trained model accurately predicts target variables in the second subset of observations. In some implementations, the machine learning system may partition the set of observations into the training set 320 and the test set 325 by including a first portion or a first percentage of the set of observations in the training set 320 (e.g., 75%, 80%, or 85%, among other examples) and including a second portion or a second percentage of the set of observations in the test set 325 (e.g., 25%, 20%, or 15%, among other examples). In some implementations, the machine learning system may randomly select observations to be included in the training set 320 and/or the test set 325.

As shown by reference number 330, the machine learning system may train a machine learning model using the training set 320. This training may include executing, by the machine learning system, a machine learning algorithm to determine a set of model parameters based on the training set 320. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 320). For example, for a regression algorithm, a model parameter may include a regression coefficient (e.g., a weight). For a decision tree algorithm, a model parameter may include a decision tree split location, as an example.

As shown by reference number 335, the machine learning system may use one or more hyperparameter sets 340 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 320. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 320. The machine learning system may tune each machine learning algorithm using one or more hyperparameter sets 340 (e.g., based on operator input that identifies hyperparameter sets 340 to be used, based on randomly generating hyperparameter values, and/or the like). The machine learning system may train a particular machine learning model using a specific machine learning algorithm and a corresponding hyperparameter set 340. In some implementations, the machine learning system may train multiple machine learning models to generate a set of model parameters for each machine learning model, where each machine learning model corresponds to a different combination of a machine learning algorithm and a hyperparameter set 340 for that machine learning algorithm.

In some implementations, the machine learning system may perform cross-validation when training a machine learning model. Cross validation can be used to obtain a reliable estimate of machine learning model performance using only the training set 320, and without using the test set 325, such as by splitting the training set 320 into a number of groups (e.g., based on operator input that identifies the number of groups, based on randomly selecting a number of groups, and/or the like) and using those groups to estimate model performance. For example, using k-fold cross-validation, observations in the training set 320 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 340 associated with a particular machine learning algorithm. The machine learning system may compare the overall cross-validation scores for different hyperparameter sets 340 associated with the particular machine learning algorithm, and may select the hyperparameter set 340 with the best (e.g., highest accuracy, lowest error, closest to a desired threshold, and/or the like) overall cross-validation score for training the machine learning model. The machine learning system may then train the machine learning model using the selected hyperparameter set 340, without cross-validation (e.g., using all of data in the training set 320 without any hold-out groups), to generate a single machine learning model for a particular machine learning algorithm. The machine learning system may then test this machine learning model using the test set 325 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 345 to be used to analyze new observations, as described below in connection with FIG. 4.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 320 (e.g., without cross-validation), and may test each machine learning model using the test set 325 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 345.

As indicated above, FIG. 3 is provided as an example. Other examples may differ from what is described in connection with FIG. 3. For example, the machine learning model may be trained using a different process than what is described in connection with FIG. 3. Additionally, or alternatively, the machine learning model may employ a different machine learning algorithm than what is described in connection with FIG. 3, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 4:
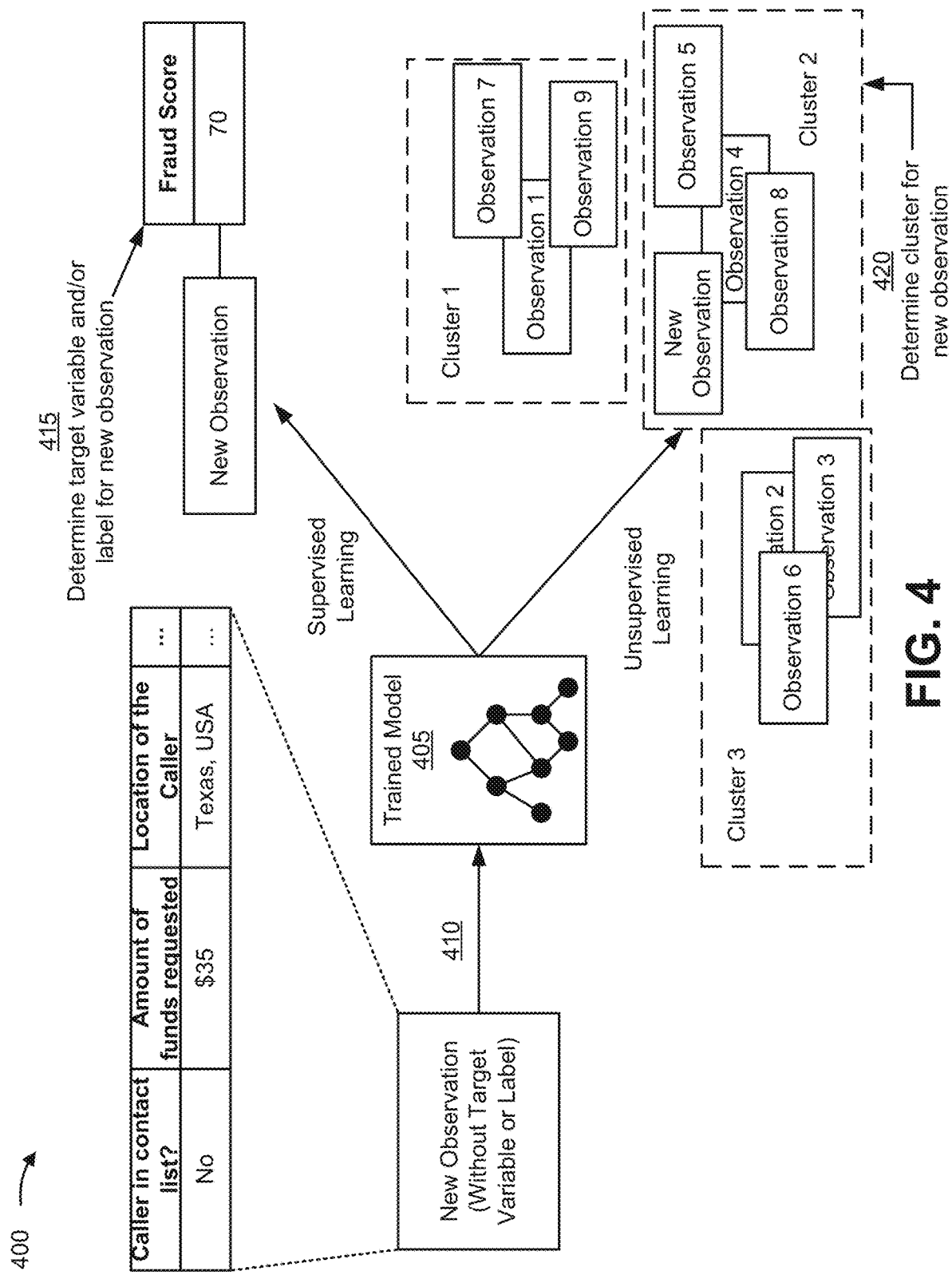

FIG. 4 is a diagram illustrating an example 400 of applying a trained machine learning model to a new observation. The new observation may be input to a machine learning system that stores a trained machine learning model 405. In some implementations, the trained machine learning model 405 may be the trained machine learning model 345 described above in connection with FIG. 3. The machine learning system may include a computing device, a server, a cloud computing environment, and/or the like, such as a fraud detection system, a user device, a calling device, a registration device, and/or an account backend device.

As shown by reference number 410, the machine learning system may receive a new observation (or a set of new observations), and may input the new observation to the machine learning model 405. As shown, the new observation may include a first feature of whether a caller is listed in a contact list, a second feature of an amount of funds requested by the caller, a third feature of a location of the caller, and so on, as an example. The machine learning system may apply the trained machine learning model 405 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observations and one or more prior observations (e.g., which may have previously been new observations input to the machine learning model and/or observations used to train the machine learning model), and/or the like, such as when unsupervised learning is employed.

In some implementations, the trained machine learning model 405 may predict a value of 70 for the target variable of "Fraud Score" for the new observation, as shown by reference number 415. Based on this prediction (e.g., based on the value having a particular label/classification, based on the value satisfying or failing to satisfy a threshold, and/or the like), the machine learning system may provide a recommendation, such as to not perform the action requested by the caller. Additionally, or alternatively, the machine learning system may perform an automated action and/or may cause an automated action to be performed (e.g., by instructing another device to perform the automated action), such as causing the user device to reject the request from the caller to perform the action, causing the user device to provide a notification to reject the request, causing the user device to not provide an input option to perform the action, and/or the like. As another example, if the machine learning system were to predict a value of 5 for the target variable of "Fraud Score," then the machine learning system may provide a different recommendation (e.g., that the purpose of the call is not fraudulent) and/or may perform or cause performance of a different automated action (e.g., by instructing another device to perform the automated action), such as causing the user device to provide a notification that the request appears safe, causing the user device to provide an input option to perform the action, and/or the like. In some implementations, the recommendation and/or the automated action may be based on the target variable value having a particular label (e.g., classification, categorization, and/or the like), may be based on whether the target variable value satisfies one or more threshold (e.g., whether the target variable value is greater than a threshold, is less than a threshold, is equal to a threshold, falls within a range of threshold values, and/or the like), and/or the like.

In some implementations, the trained machine learning model 405 may classify (e.g. cluster) the new observation in a particular cluster, as shown by reference number 420. The observations within a cluster may have a threshold degree of similarity. Based on classifying the new observation in the particular cluster, the machine learning system may provide a recommendation, such as a recommendation that it is safe or unsafe to perform the action requested by the caller. Additionally, or alternatively, the machine learning system may perform an automated action and/or may cause an automated action to be performed (e.g., by instructing another device to perform the automated action), such as causing the user device to reject the request from the caller to perform the action. As another example, if the machine learning system were to classify the new observation in a different cluster, then the machine learning system may provide a different recommendation (e.g., that the purpose of the call is not fraudulent) and/or may perform or cause performance of a different automated action (e.g., by instructing another device to perform the automated action), such as causing the user device to perform the action requested by the caller).

In this way, the machine learning system may apply a rigorous and automated process to detect fraud. The machine learning system enables recognition and/or identification of tens, hundreds, thousands, or millions of features and/or feature values for tens, hundreds, thousands, or millions of observations, thereby increasing an accuracy and consistency of detecting fraud relative to requiring computing resources to be allocated for tens, hundreds, or thousands of operators to manually detect fraud using the features or feature values.

As indicated above, FIG. 4 is provided as an example. Other examples may differ from what is described in connection with FIG. 4.

Figure 5:
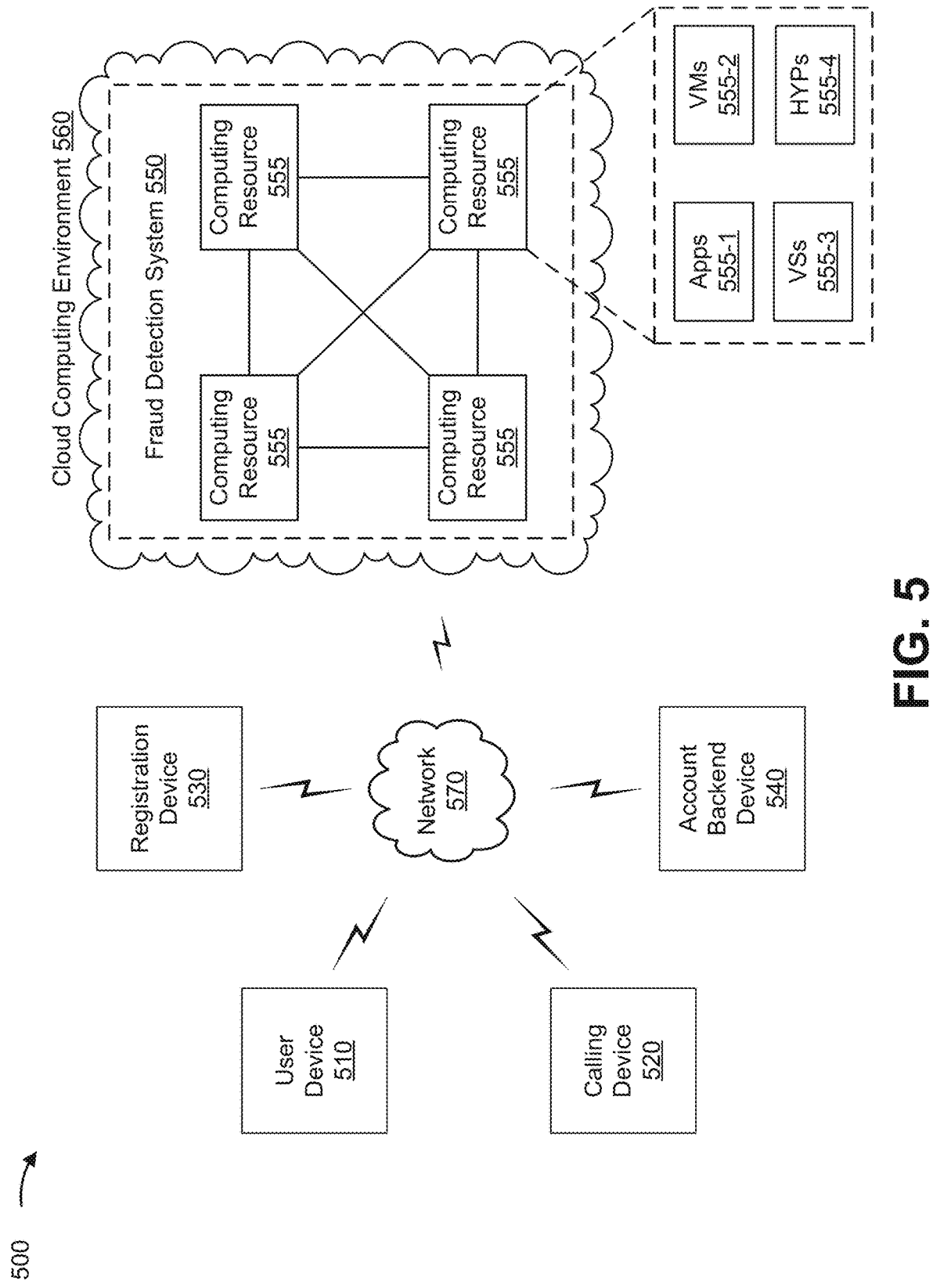
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a user device 510, a calling device 520, a registration device 530, an account backend device 540, a fraud detection system 550, one or more computing resources 555, a cloud computing environment 560, and a network 570. Devices of environment 500 may interconnect via wired connections, wireless connections, or a combination of wired and wireless connections.

User device 510 includes one or more devices capable of receiving, generating, storing, processing, and/or providing information associated with custom call screening based on analyzing transcriptions of voice inputs received by the user device 510 and/or device information described herein. For example, user device 510 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Calling device 520 includes one or more devices capable of receiving, generating, storing, processing, and/or providing information associated with caller information and/or request information described herein. For example, calling device 520 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Registration device 530 includes one or more devices capable of receiving, generating, storing, processing, and/or providing information, such as registration information and/or device information described herein. For example, registration device 530 may include a laptop computer, a tablet computer, a desktop computer, a server device, a group of server devices, or a similar type of device associated with a merchant, a financial institution, and/or the like. In some implementations, registration device 530 may receive information from and/or transmit information to user device 510, calling device 520, account backend device 540, and/or fraud detection system 550.

Account backend device 540 includes one or more devices capable of receiving, generating, storing, processing, and/or providing information, such as account information described herein. For example, account backend device 540 may include a laptop computer, a tablet computer, a desktop computer, a server device, a group of server devices, or a similar type of device associated with a merchant, a financial institution, and/or the like. In some implementations, account backend device 540 may receive information from and/or transmit information to user device 510, calling device 520, registration device 530, and/or fraud detection system 550.

Fraud detection system 550 includes one or more computing resources assigned to determine a fraud score based on call information and/or request information. For example, fraud detection system 550 may be a platform implemented by cloud computing environment 560 that may receive information from and/or transmit information to one or more user devices 510, calling devices 520, registration devices 530, and/or account backend devices 540. In some implementations, fraud detection system 550 may be designed to be modular such that certain software components may be swapped in or out depending on a particular need. As such, fraud detection system 550 may be easily and/or quickly reconfigured for different uses. In some implementations, fraud detection system 550 is implemented by computing resources 555 of cloud computing environment 560.

Fraud detection system 550 may include a server device or a group of server devices. In some implementations, fraud detection system 550 may be hosted in cloud computing environment 560. Notably, while implementations described herein may describe fraud detection system 550 as being hosted in cloud computing environment 560, in some implementations, fraud detection system 550 may be non-cloud-based or may be partially cloud-based.

Cloud computing environment 560 includes an environment that delivers computing as a service, whereby shared resources, services, and/or the like may be provided to one or more user devices 510, calling devices 520, registration devices 530, account backend devices 540, and/or fraud detection system 550. Cloud computing environment 560 may provide computation, software, data access, storage, and/or other services that do not require end-user knowledge of a physical location and configuration of a system and/or a device that delivers the services. As shown, cloud computing environment 560 may include fraud detection system 550 and computing resource 555.

Computing resource 555 includes one or more personal computers, workstation computers, server devices, or another type of computation and/or communication device. In some implementations, computing resource 555 may host fraud detection system 550. The cloud resources may include compute instances executing in computing resource 555, storage devices provided in computing resource 555, data transfer devices provided by computing resource 555, and/or the like. In some implementations, computing resource 555 may communicate with other computing resources 555 via wired connections, wireless connections, or a combination of wired and wireless connections.

As further shown in FIG. 5, computing resource 555 may include a group of cloud resources, such as one or more applications ("APPs") 555-1, one or more virtual machines ("VMs") 555-2, virtualized storage ("VSs") 555-3, one or more hypervisors ("HYPs") 555-4, or the like.

Application 555-1 includes one or more software applications that may be provided to or accessed by user device 510. Application 555-1 may eliminate a need to install and execute the software applications on user device 510 and/or calling device 520. For example, application 555-1 may include software associated with fraud detection system 550 and/or any other software capable of being provided via cloud computing environment 560. In some implementations, one application 555-1 may send/receive information to/from one or more other applications 555-1, via virtual machine 555-2.

Virtual machine 555-2 includes a software implementation of a machine (e.g., a computer) that executes programs like a physical machine. Virtual machine 555-2 may be either a system virtual machine or a process virtual machine, depending upon use and degree of correspondence to any real machine by virtual machine 555-2. A system virtual machine may provide a complete system platform that supports execution of a complete operating system ("OS"). A process virtual machine may execute a single program and may support a single process. In some implementations, virtual machine 555-2 may execute on behalf of a user (e.g., user device 510), and may manage infrastructure of cloud computing environment 560, such as data management, synchronization, or long-duration data transfers.

Virtualized storage 555-3 includes one or more storage systems and/or one or more devices that use virtualization techniques within the storage systems or devices of computing resource 555. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 555-4 provides hardware virtualization techniques that allow multiple operating systems (e.g., "guest operating systems") to execute concurrently on a host computer, such as computing resource 555. Hypervisor 555-4 may present a virtual operating platform to the "guest operating systems" and may manage the execution of the guest operating systems. Multiple instances of a variety of operating systems may share virtualized hardware resources.

Network 570 includes one or more wired and/or wireless networks. For example, network 570 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 5 are provided as one or more examples. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
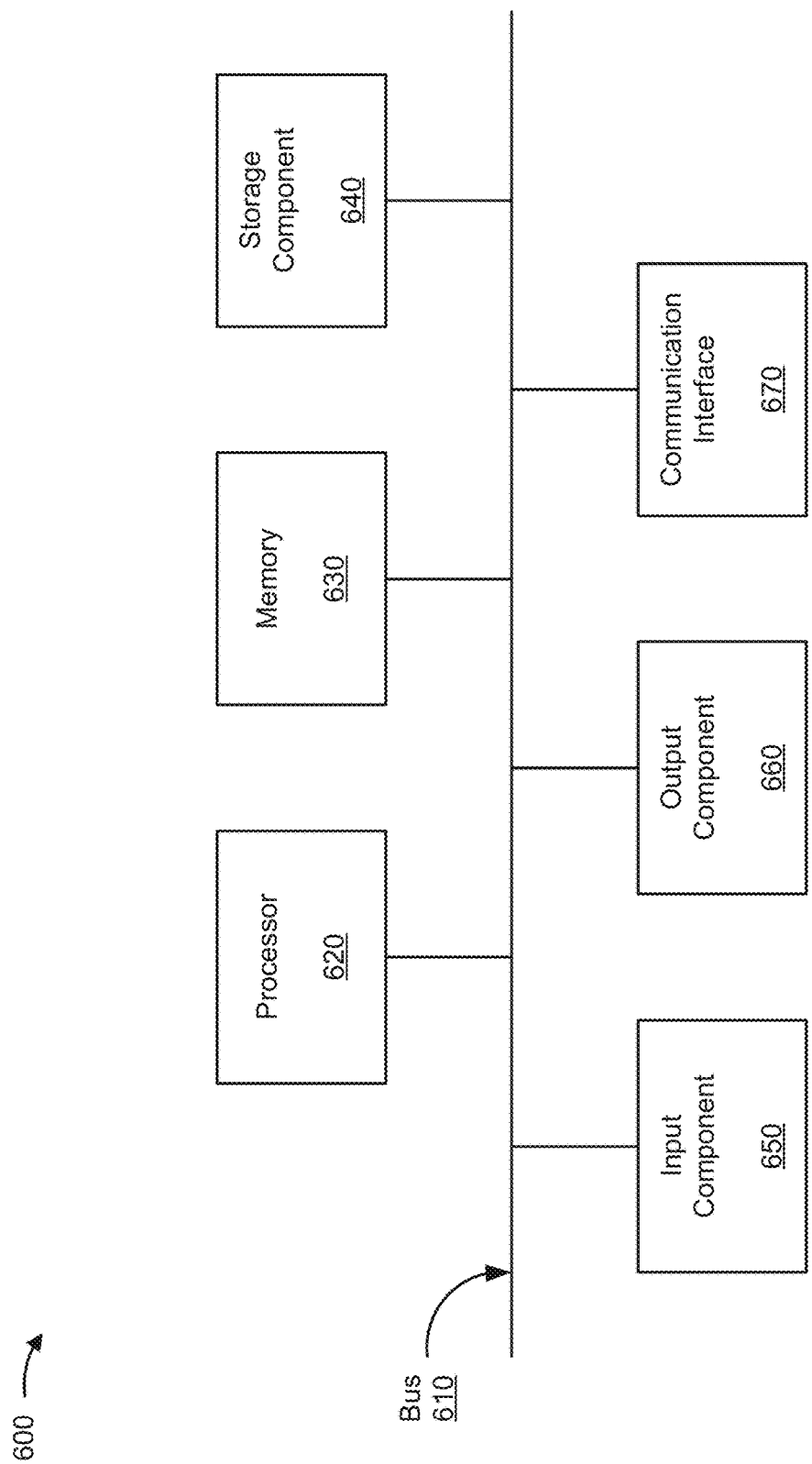
FIG. 6 is a diagram of example components of one or more devices of FIG. 5.

FIG. 6 is a diagram of example components of a device 600. Device 600 may correspond to user device 510, calling device 520, registration device 530, account backend device 540, and/or fraud detection system 550. In some implementations, user device 510, calling device 520, registration device 530, account backend device 540, and/or fraud detection system 550 may include one or more devices 600 and/or one or more components of device 600. As shown in FIG. 6, device 600 may include a bus 610, a processor 620, a memory 630, a storage component 640, an input component 650, an output component 660, and a communication interface 670.

Bus 610 includes a component that permits communication among the components of device 600. Processor 620 is implemented in hardware, firmware, or a combination of hardware and software. Processor 620 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 650 includes a component that permits device 600 to receive information, such as via user input (e.g., a touch screen display, a keyboard, a keypad, a mouse, a button, a switch, and/or a microphone). Additionally, or alternatively, input component 650 may include a sensor for sensing information (e.g., a global positioning system (GPS) component, an accelerometer, a gyroscope, and/or an actuator). Output component 660 includes a component that provides output information from device 600 (e.g., a display, a speaker, and/or one or more LEDs).

Communication interface 670 includes a transceiver-like component (e.g., a transceiver and/or a separate receiver and transmitter) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, an RF interface, a universal serial bus (USB) interface, a wireless local area interface, a cellular network interface, and/or the like.

Device 600 may perform one or more processes described herein. Device 600 may perform these processes based on processor 620 executing software instructions stored by a non-transitory computer-readable medium, such as memory 630 and/or storage component 640. A computer-readable medium is defined herein as a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
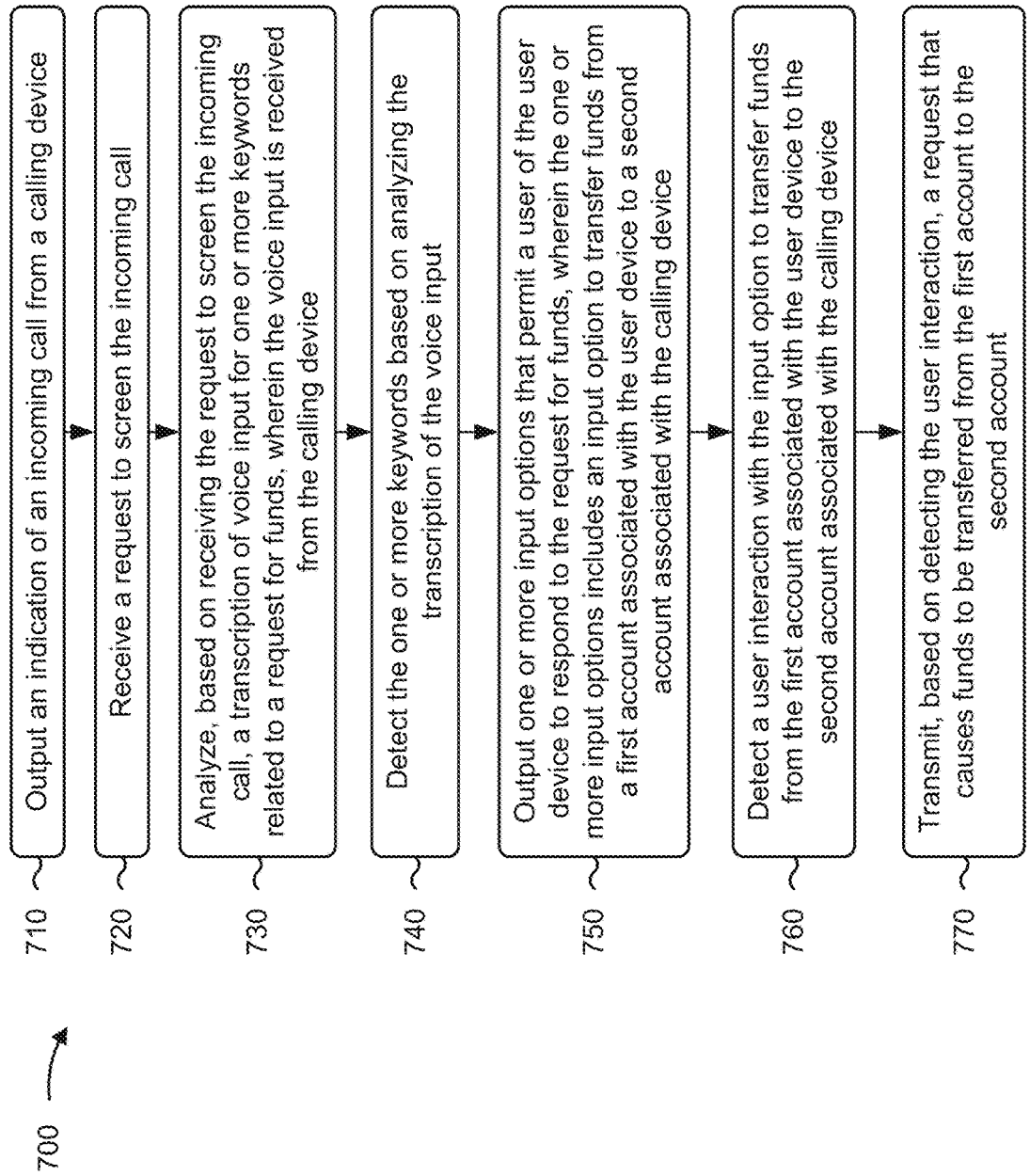

FIG. 7 is a flow chart of an example process 700 for performing a custom action during call screening based on a purpose of a voice call. In some implementations, one or more process blocks of FIG. 7 may be performed by a user device (e.g., user device 510). In some implementations, one or more process blocks of FIG. 7 may be performed by another device or a group of devices separate from or including the user device, such as a calling device (e.g., calling device 520), a registration device (e.g., registration device 530), an account backend device (e.g., account backend device 540), a fraud detection system (e.g., fraud detection system 550), and/or the like.

As shown in FIG. 7, process 700 may include outputting an indication of an incoming call from a calling device (block 710). For example, the user device (e.g., using processor 620, memory 630, storage component 640, input component 650, output component 360, communication interface 670, and/or the like) may output an indication of an incoming call from a calling device, as described above.

As further shown in FIG. 7, process 700 may include receiving a request to screen the incoming call (block 720). For example, the user device (e.g., using processor 620, memory 630, storage component 640, input component 650, output component 660, communication interface 370, and/or the like) may receive a request to screen the incoming call, as described above.

As further shown in FIG. 7, process 700 may include analyzing, based on receiving the request to screen the incoming call, a transcription of voice input for one or more keywords related to a request for funds, wherein the voice input is received from the calling device (block 730). For example, the user device (e.g., using processor 620, memory 630, storage component 640, input component 650, output component 660, communication interface 670, and/or the like) may analyze, based on receiving the request to screen the incoming call, a transcription of voice input for one or more keywords related to a request for funds, as described above. In some implementations, the voice input is received from the calling device.

As further shown in FIG. 7, process 700 may include detecting the one or more keywords based on analyzing the transcription of the voice input (block 740). For example, the user device (e.g., using processor 620, memory 630, storage component 640, input component 650, output component 660, communication interface 670, and/or the like) may detect the one or more keywords based on analyzing the transcription of the voice input, as described above.

As further shown in FIG. 7, process 700 may include outputting one or more input options that permit a user of the user device to respond to the request for funds, wherein the one or more input options includes an input option to transfer funds from a first account associated with the user device to a second account associated with the calling device (block 750). For example, the user device (e.g., using processor 620, memory 630, storage component 640, input component 650, output component 660, communication interface 670, and/or the like) may output one or more input options that permit a user of the user device to respond to the request for funds, as described above. In some implementations, the one or more input options includes an input option to transfer funds from a first account associated with the user device to a second account associated with the calling device.

As further shown in FIG. 7, process 700 may include detecting a user interaction with the input option to transfer funds from the first account associated with the user device to the second account associated with the calling device (block 760). For example, the user device (e.g., using processor 620, memory 630, storage component 640, input component 650, output component 660, communication interface 670, and/or the like) may detect a user interaction with the input option to transfer funds from the first account associated with the user device to the second account associated with the calling device, as described above.

As further shown in FIG. 7, process 700 may include transmitting, based on detecting the user interaction, a request that causes funds to be transferred from the first account to the second account (block 770). For example, the user device (e.g., using processor 620, memory 630, storage component 640, input component 650, output component 660, communication interface 670, and/or the like) may transmit, based on detecting the user interaction, a request that causes funds to be transferred from the first account to the second account, as described above.

Process 700 may include additional implementations, such as any single implementation or any combination of implementations described below and/or in connection with one or more other processes described elsewhere herein.

In a first implementation, the one or more keywords includes a numeric value, the input option to transfer funds is an input option to transfer an amount of funds equal to the numeric value, and transmitting the request that causes the funds to be transferred comprises transmitting a request that causes the amount of funds equal to the numeric value to be transferred from the first account to the second account.

In a second implementation, alone or in combination with the first implementation, the input option to transfer funds permits a user of the user device to input a numeric value, and transmitting the request that causes the funds to be transferred comprises transmitting a request that causes an amount of funds equal to the numeric value to be transferred from the first account to the second account.

In a third implementation, alone or in combination with one or more of the first and second implementations, the one or more input options includes at least one of: a first input option to transfer funds equal to a numeric value detected in the transcription of the voice input, a second input option to transfer a different amount of funds than a numeric value detected in the transcription of the voice input, a third input option to input a custom amount of funds to be transferred, a fourth input option to deny transfer of funds, a fifth input option to request additional information regarding the request for funds, a sixth input option to block the calling device, or a seventh input option to report the calling device as spam.

In a fourth implementation, alone or in combination with one or more of the first through third implementations, the transcription is analyzed for the one or more keywords, or the one or more input options are output, based on the calling device being associated with the whitelist.

In a fifth implementation, alone or in combination with one or more of the first through fourth implementations, at least one of the first account or the second account is identified based on the user device being registered with a call screening application, of the user device, that analyzes the transcription for the one or more keywords or outputs the one or more input options.

In a sixth implementation, alone or in combination with one or more of the first through fifth implementations, the transcription is analyzed for the one or more keywords, or the one or more input options are output, based on performing the fraud detection in association with the incoming call.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
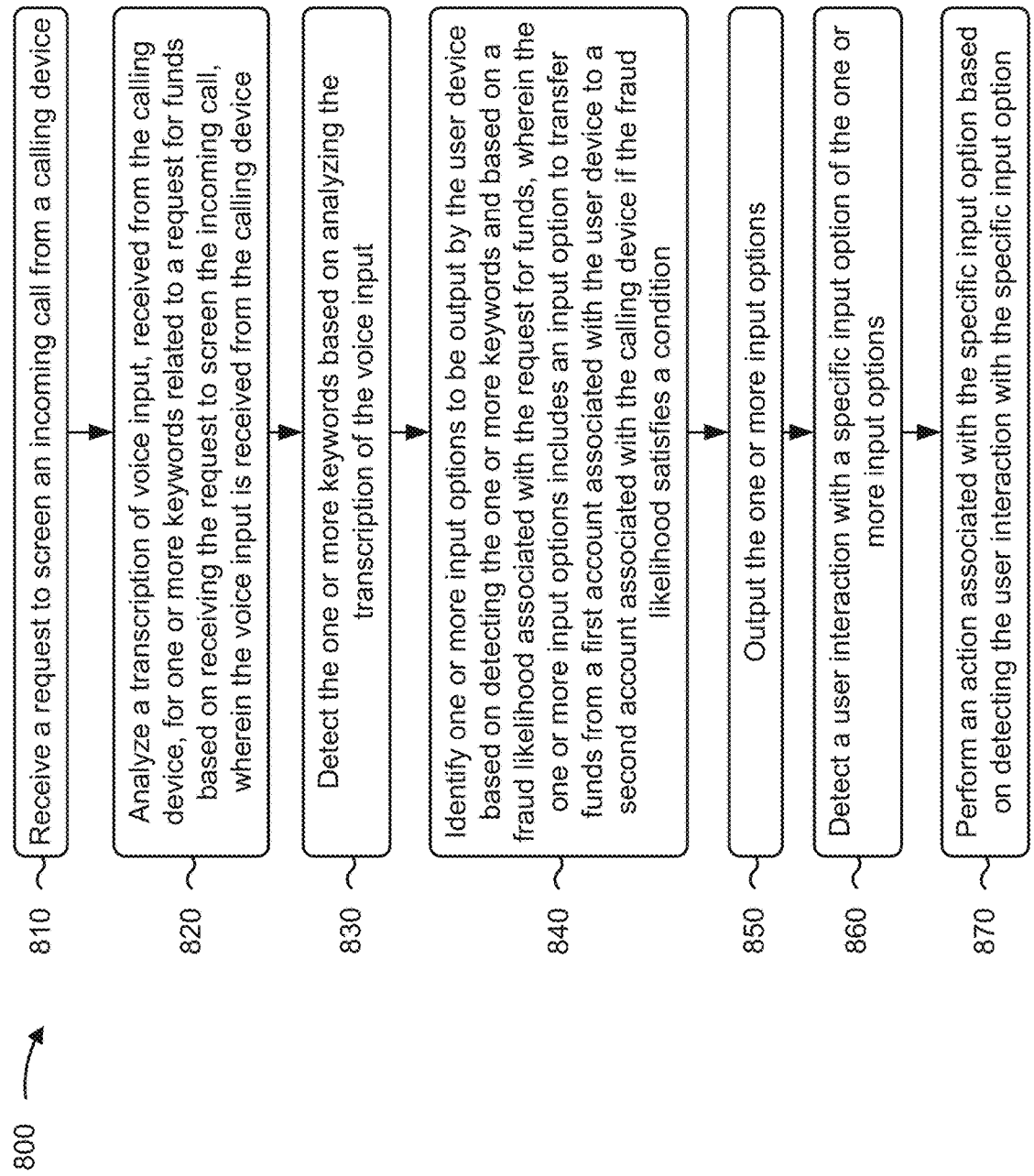

FIG. 8 is a flow chart of an example process 800 for performing a custom action during call screening based on a purpose of a voice call. In some implementations, one or more process blocks of FIG. 8 may be performed by a user device (e.g., user device 510). In some implementations, one or more process blocks of FIG. 8 may be performed by another device or a group of devices separate from or including the user device, such as a calling device (e.g., calling device 520), a registration device (e.g., registration device 530), an account backend device (e.g., account backend device 540), a fraud detection system (e.g., fraud detection system 550), and/or the like.

As shown in FIG. 8, process 800 may include receiving a request to screen an incoming call from a calling device (block 810). For example, the user device (e.g., using processor 620, memory 630, storage component 640, input component 650, output component 660, communication interface 670, and/or the like) may receive a request to screen an incoming call from a calling device, as described above.

As further shown in FIG. 8, process 800 may include analyzing a transcription of voice input for one or more keywords related to a request for funds based on receiving the request to screen the incoming call, wherein the voice input is received from the calling device (block 820). For example, the user device (e.g., using processor 620, memory 630, storage component 640, input component 650, output component 660, communication interface 670, and/or the like) may analyze a transcription of voice input for one or more keywords related to a request for funds based on receiving the request to screen the incoming call, as described above. In some implementations, the voice input is received from the calling device.

As shown in FIG. 8, process 800 may include detecting the one or more keywords based on analyzing the transcription of the voice input (block 830). For example, the user device (e.g., using processor 620, memory 630, storage component 640, input component 650, output component 660, communication interface 670, and/or the like) may detect the one or more keywords based on analyzing the transcription of the voice input, as described above.

As further shown in FIG. 8, process 800 may include identifying one or more input options to be output by the user device based on detecting the one or more keywords and based on a fraud likelihood associated with the request for funds, wherein the one or more input options includes an input option to transfer funds from a first account associated with the user device to a second account associated with the calling device if the fraud likelihood satisfies a condition (block 840). For example, the user device (e.g., using processor 620, memory 630, storage component 640, input component 650, output component 660, communication interface 670, and/or the like) may identify one or more input options to be output by the user device based on detecting the one or more keywords and based on a fraud likelihood associated with the request for funds, as described above. In some implementations, the one or more input options includes an input option to transfer funds from a first account associated with the user device to a second account associated with the calling device if the fraud likelihood satisfies a condition.

As shown in FIG. 8, process 800 may include outputting the one or more input options (block 850). For example, the user device (e.g., using processor 620, memory 630, storage component 640, input component 650, output component 660, communication interface 670, and/or the like) may output the one or more input options, as described above.

As shown in FIG. 8, process 800 may include detecting a user interaction with a specific input option of the one or more input options (block 860). For example, the user device (e.g., using processor 620, memory 630, storage component 640, input component 650, output component 660, communication interface 670, and/or the like) may detect a user interaction with a specific input option of the one or more input options, as described above.

As further shown in FIG. 8, process 800 may include performing an action associated with the specific input option based on detecting the user interaction with the specific input option (block 870). For example, the user device (e.g., using processor 620, memory 630, storage component 640, input component 650, output component 660, communication interface 670, and/or the like) may perform an action associated with the specific input option based on detecting the user interaction with the specific input option, as described above.

Process 800 may include additional implementations, such as any single implementation or any combination of implementations described below and/or in connection with one or more other processes described elsewhere herein.

In a first implementation, the action includes at least one of: transmitting a request that causes funds to be transferred from the first account to the second account, denying the request for funds, ending the incoming call, transmitting a request, to the calling device, for additional information regarding the request for funds, blocking the calling device, or reporting at least one of the incoming call or the calling device as spam.

In a second implementation, alone or in combination with the first implementation, the fraud likelihood is determined based on at least one of: whether the calling device is identified in a contact list associated with the user device, whether the calling device is registered with a call screening account associated with the user device, whether the calling device is associated with a whitelist of the call screening account, whether the calling device is associated with a blacklist of the call screening account, a user preference associated with the call screening account, an amount of requested funds associated with the request for funds, one or more fraud keywords detected based on analyzing the transcription of the voice input, a number of fund requests associated with the calling device, a time period over which the number of fund requests were made, an identity verification procedure performed in association with at least one of the user device or the calling device, or information received from a fraud detection system.

In a third implementation, alone or in combination with one or more of the first and second implementations, the fraud likelihood is calculated by the user device or is received from another device.

In a fourth implementation, alone or in combination with one or more of the first through third implementations, the fraud likelihood is determined using a machine learning model.

In a fifth implementation, alone or in combination with one or more of the first through fourth implementations, process 800 includes determining that the second account associated with the calling device has not been registered with call screening account associated with the user device; output an input option for a user of the calling device to input is accounting information for the second account; and receiving the account information for the second account based on user interaction with the input option for the user of the calling device to input the account information.

In a sixth implementation, alone or in combination with one or more of the first through fifth implementations, the one or more input options are identified based on registration information associated with a call screening account that is associated with the user device.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a flow chart of an example process 900 for performing a custom action during call screening based on a purpose of a voice call. In some implementations, one or more process blocks of FIG. 9 may be performed by a user device (e.g., user device 510). In some implementations, one or more process blocks of FIG. 9 may be performed by another device or a group of devices separate from or including the user device, such as a calling device (e.g., calling device 520), a registration device (e.g., registration device 530), an account backend device (e.g., account backend device 540), a fraud detection system (e.g., fraud detection system 550), and/or the like.

As shown in FIG. 9, process 900 may include screening a call from a calling device (block 910). For example, the user device (e.g., using processor 620, memory 630, storage component 640, input component 650, output component 660, communication interface 670, and/or the like) may screen a call from a calling device, as described above.

As further shown in FIG. 9, process 900 may include analyzing a transcription of voice input for one or more keywords related to a request for funds based on screening the call, wherein the voice input is received from the calling device (block 920). For example, the user device (e.g., using processor 620, memory 630, storage component 640, input component 650, output component 660, communication interface 670, and/or the like) may analyze a transcription of voice input for one or more keywords related to a request for funds based on screening the call, as described above. In some implementations, the voice input is received from the calling device.

As further shown in FIG. 9, process 900 may include detecting the one or more keywords based on analyzing the transcription of the voice input (block 930). For example, the user device (e.g., using processor 620, memory 630, storage component 640, input component 650, output component 660, communication interface 670, and/or the like) may detect the one or more keywords based on analyzing the transcription of the voice input, as described above.

As further shown in FIG. 9, process 900 may include identifying one or more input options to be output by the user device based on the one or more keywords and based on registration information associated with a call screening account that is associated with the user device, wherein the one or more input options includes an input option to transfer funds from a first account associated with the user device to a second account associated with the calling device if a condition associated with at least one of the one or more keywords or the registration information is satisfied (block 940). For example, the user device (e.g., using processor 620, memory 630, storage component 640, input component 650, output component 660, communication interface 670, and/or the like) may identify one or more input options to be output by the user device based on the one or more keywords and based on registration information associated with a call screening account that is associated with the user device, as described above. In some implementations, the one or more input options includes an input option to transfer funds from a first account associated with the user device to a second account associated with the calling device if a condition associated with at least one of the one or more keywords or the registration information is satisfied.

As further shown in FIG. 9, process 900 may include outputting the one or more input options (block 950). For example, the user device (e.g., using processor 620, memory 630, storage component 640, input component 650, output component 660, communication interface 670, and/or the like) may output the one or more input options, as described above.

shown in FIG. 9, process 900 may include detecting a user interaction with a specific input option of the one or more input options (block 960). For example, the user device (e.g., using processor 620, memory 630, storage component 640, input component 650, output component 660, communication interface 670, and/or the like) may detect a user interaction with a specific input option of the one or more input options, as described above.

As further shown in FIG. 9, process 900 may include performing an action associated with the specific input option based on detecting the user interaction with the specific input option (block 970). For example, the user device (e.g., using processor 620, memory 630, storage component 640, input component 650, output component 660, communication interface 670, and/or the like) may perform an action associated with the specific input option based on detecting the user interaction with the specific input option, as described above.

Process 900 may include additional implementations, such as any single implementation or any combination of implementations described below and/or in connection with one or more other processes described elsewhere herein.

In a first implementation, the one or more input options includes at least one of: a first input option to transfer funds equal to a numeric value detected in the transcription of the voice input, a second input option to transfer a different amount of funds than a numeric value detected in the transcription of the voice input, a third input option to input a custom amount of funds to be transferred, a fourth input option to deny transfer of funds, a fifth input option to request additional information regarding the request for funds, a sixth input option to block the calling device, or a seventh input option to report the calling device as spam.

In a second implementation, alone or in combination with the first implementation, the one or more input options are identified based on at least one of: whether the calling device is identified in the registration information, whether the second account associated with the calling device is registered in the registration information, whether the calling device is associated with a whitelist included in the registration information, whether the calling device is associated with a blacklist included in the registration information, a user preference indicated in the registration information, a maximum transfer amount per call indicated in the registration information, a maximum transfer amount per time period indicated in the registration information, or a maximum transfer amount per calling device indicated in the registration information.

In a third implementation, alone or in combination with one or more of the first and second implementations, the one or more input options are identified based on a fraud likelihood determined for the request for funds.

In a fourth implementation, alone or in combination with one or more of the first through third implementations, the fraud likelihood is determined based on at least one of: one or more fraud keywords detected based on analyzing the transcription of the voice input, a number of fund requests associated with the calling device, a time period over which the number of fund requests were made, an identity verification procedure performed in association with at least one of the user device or the calling device, or information received from a fraud detection system.

In a fifth implementation, alone or in combination with one or more of the first through fourth implementations, the one or more instructions, when executed by the one or more processors, further cause the one or more processors to selectively output an alert that indicates potential fraud based on the fraud likelihood.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   automatically screening, by a user device, a call from a calling device based on user device setting information and whether a phone number associated with the calling device is listed in whitelist information;
   analyzing, by the user device and based on screening the call, a transcription of voice input, from the calling device, related to a purpose of the call;
   outputting, by the user device, one or more input options that permit a response to the purpose of the call, wherein outputting the one or more input options comprises:

outputting the one or more input options based on a likelihood that the purpose of the call is fraudulent and based on detecting keywords in the transcription;

detecting, by the user device, a user interaction with a specific input option of the one or more input options; and performing, by the user device, an action associated with the specific input option based on detecting the user interaction with the specific input option.

2. The method of claim 1, where outputting the one or more input options that permit the response to the purpose of the call further comprises:
outputting the one or more input options that permit the response to the purpose of the call based on a fraud likelihood,
wherein the fraud likelihood is calculated by the user device or is received from another device.

3. The method of claim 1, where automatically screening the call from the calling device comprises:
automatically screening the call based on:
user preference information, or
registration information.

4. The method of claim 1, where performing the action comprises:
causing the action to be performed in conjunction with an account backend device.

5. The method of claim 1, further comprising:
providing, for display, the transcription of the voice input and information identifying the one or more input options.

6. The method of claim 1, where performing the action comprises:
transmitting a request that causes funds to be transferred from a first account associated with the user device to a second account associated with the calling device; or
transmitting a message requesting authentication information to the calling device.

7. The method of claim 1, where analyzing the transcription of the voice input comprises:
analyzing the transcription of the voice input to detect one or more keywords in the transcription of the voice input,
wherein the one or more keywords indicate the purpose for the call.

8. A user device, comprising:
one or more memories; and
one or more processors, communicatively coupled to the one or more memories, configured to:
automatically screen a call from a calling device based on user device setting information and whether a phone number associated with the calling device is listed in whitelist information;
analyze, based on screening the call, a transcription of voice input, from the calling device;
output one or more input options that permit a response to the call,
wherein the one or more processors, when outputting the one or more input options, are configured to:
output the one or more input options based on a likelihood that a purpose of the call is fraudulent and based on detecting keywords in the transcription;
detect a user interaction with a specific input option of the one or more input options; and
perform an action associated with the specific input option based on detecting the user interaction with the specific input option.

9. The user device of claim 8, where the one or more processors, when outputting the one or more input options that permit the response to the call, are further configured to:
output the one or more input options that permit the response to the call based on a fraud likelihood,
wherein the fraud likelihood is calculated based on one or more of:
identity information about a caller,
a location identifier of the caller, or
an amount of funds requested.

10. The user device of claim 8, where the one or more processors are further configured to:
automatically screen the call from the calling device based on information associated with a call screening account that is associated with the user device,
the information including one or more of:
user preference information,
registration information, or
blacklist information.

11. The user device of claim 8, where the one or more processors, when performing the action, are configured to:
cause the action to be performed in conjunction with an account backend device.

12. The user device of claim 8, where the one or more processors are further configured to:
receive the voice input; and
convert the voice input into text using one or more speech-to-text models.

13. The user device of claim 8, where the one or more processors, when performing the action, are configured to:
transmit a request that causes funds to be transferred from a first account associated with the user device to a second account associated with the calling device; or
transmit a message requesting authentication information to the calling device.

14. The user device of claim 8, where the one or more processors, when analyzing the transcription of the voice input, are configured to:
analyze the transcription of the voice input to detect one or more keywords in the transcription of the voice input,
wherein the one or more keywords indicate the purpose for the call.

15. A non-transitory computer-readable medium storing instructions, the instructions comprising:
one or more instructions that, when executed by one or more processors of a user device, cause the one or more processors to:
automatically screen a call from a calling device based on user device setting information and whether a phone number associated with the calling device is listed in whitelist information;
analyze, based on automatically screening the call, data from the calling device related to a purpose of the call;
output, by the user device, one or more input options that permit a response associated with the purpose of the call,
where the one or more instructions, when executed by the one or more processors to output the one or more input options that permit the response associated with the purpose of the call, cause the one or more processors to:

output the one or more input options based on a likelihood that the purpose of the call is fraudulent and based on detecting keywords in the call;

detect a user interaction with a specific input option of the one or more input options; and perform an action associated with the specific input option based on detecting the user interaction with the specific input option.

16. The non-transitory computer-readable medium of claim 15, where the one or more instructions, when executed by the one or more processors to output the one or more input options that permit the response to the call, further cause the one or more processors to:

output an indication option along with the one or more input options based on a fraud likelihood,
wherein the fraud likelihood is calculated by the user device or is received from another device, and
wherein the indication is one or more of:
an alert,
a popup, or
a notification.

17. The non-transitory computer-readable medium of claim 15, where the one or more instructions, when executed by the one or more processors to automatically screen the call are to:

automatically screen the call based on blacklist information.

18. The non-transitory computer-readable medium of claim 15, where the one or more instructions, when executed by the one or more processors, further cause the one or more processors to:

provide, for display, information identifying the one or more input options.

19. The non-transitory computer-readable medium of claim 15, where the one or more instructions, when executed by the one or more processors to perform the action, cause the one or more processors to:

transmit a request that causes funds to be transferred from a first account associated with the user device to a second account associated with the calling device.

20. The non-transitory computer-readable medium of claim 15, where the one or more instructions, when executed by the one or more processors to analyze the data, cause the one or more processors to:

analyze the data to detect one or more keywords,
wherein the one or more keywords indicate the purpose for the call.

* * * * *